US012183190B2

(12) United States Patent
White

(10) Patent No.: US 12,183,190 B2
(45) Date of Patent: Dec. 31, 2024

(54) EARLY TRAFFIC EVENT DRIVER NOTIFICATION

(71) Applicant: Telefonaktiebolaget LM Ericsson (publ), Stockholm (SE)

(72) Inventor: Kyle White, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 225 days.

(21) Appl. No.: 17/909,543

(22) PCT Filed: Mar. 25, 2021

(86) PCT No.: PCT/IB2021/052492
§ 371 (c)(1),
(2) Date: Sep. 6, 2022

(87) PCT Pub. No.: WO2021/198862
PCT Pub. Date: Oct. 7, 2021

(65) Prior Publication Data

US 2023/0113812 A1 Apr. 13, 2023

Related U.S. Application Data

(60) Provisional application No. 63/001,689, filed on Mar. 30, 2020.

(51) Int. Cl.
*G08G 1/01* (2006.01)
*G08G 1/0967* (2006.01)
*G08G 1/16* (2006.01)

(52) U.S. Cl.
CPC ......... *G08G 1/0133* (2013.01); *G08G 1/0112* (2013.01); *G08G 1/0141* (2013.01); *G08G 1/096791* (2013.01); *G08G 1/164* (2013.01)

(58) Field of Classification Search
CPC ............... G08G 1/0133; G08G 1/0112; G08G 1/0141; G08G 1/096791; G08G 1/164; G08G 1/096741
See application file for complete search history.

(56) References Cited

U.S. PATENT DOCUMENTS

2004/0245853 A1* 12/2004 Odagawa .............. G08G 1/164 303/191
2018/0049088 A1* 2/2018 Shiga ..................... H04W 4/44
(Continued)

FOREIGN PATENT DOCUMENTS

WO 2018/046106 A1 3/2018

OTHER PUBLICATIONS

International Search Report and Written Opinion dated Jun. 15, 2021 issued in PCT Application No. PCT/IB2021/052492, consisting of 12 pages.

*Primary Examiner* — Brian Wilson
(74) *Attorney, Agent, or Firm* — Sonoda & Kobayashi Intellectual Property Law; Sarvajit S. Patil

(57) ABSTRACT

A network node that communicates with a set of wireless devices (WDs) is provided. The set of WDs includes at least a first WD that detects a traffic event and a group of other WDs. The network node comprises processing circuitry configured to determine a space corresponding to the first WD. The determined space has at least a dynamic dimension that is based at least on a vehicle traffic factor of a plurality of vehicle traffic factors associated with the first WD. Each of the WDs of the group of other WDs is determined to be within the space corresponding to the first WD. A first message is received from the first WD, where the first message is associated with the traffic event. A second message is transmitted to each of the WDs of the group of other WDs based in part on the traffic event.

26 Claims, 14 Drawing Sheets

(56) References Cited

U.S. PATENT DOCUMENTS

| | | | | |
|---|---|---|---|---|
| 2018/0176742 | A1* | 6/2018 | Narayanan ....... | G08G 1/096783 |
| 2019/0325750 | A1* | 10/2019 | Bielby ................. | G08G 1/0133 |

* cited by examiner

EARLY TRAFFIC EVENT DRIVER NOTIFICATION

CROSS-REFERENCE TO RELATED APPLICATIONS

This application is a Submission Under 35 U.S.C. § 371 for U.S. National Stage Patent Application of International Application No.: PCT/IB2021/052492, filed Mar. 25, 2021 entitled "EARLY TRAFFIC EVENT DRIVER NOTIFICATION," which claims priority to U.S. Provisional Application No. 63/001,689, filed Mar. 30, 2020, entitled "EARLY TRAFFIC EVENT DRIVER NOTIFICATION," the entireties of both of which are incorporated herein by reference.

TECHNICAL FIELD

The present disclosure relates to wireless communications, and in particular, to using wireless device technologies and cellular network technologies to provide an advanced driver warning system that enables drivers to be more aware of hazardous road conditions.

BACKGROUND

Advanced braking notification solutions typically rely on Light Detection and Ranging (LiDAR) technology that is installed on a vehicle and can only collect information that is based on another vehicle that is immediately in front of the vehicle using LiDAR. In many cases when this technology is available on the vehicle, the collected information may still be insufficient because LiDAR does not take into account other parameters that can affect safety. For example, a driver of a vehicle using LiDAR may be maintaining an acceptable LiDAR distance, but not maintaining a safe driving distance based on the current road conditions, e.g., a safe driving distance that will lead to safe braking on an icy road. In addition, LiDAR-based advanced braking solutions have range/capabilities limitations. For example, LiDAR-based advanced braking solutions are not capable of forewarning drivers of dangerous circumstances that are happening beyond the vehicle immediately in front.

The following are nonlimiting scenarios where a LiDAR system may perform poorly:

1. A group of vehicles driving in the same direction in a trailing arrangement, i.e., a first vehicle followed by a second vehicle that is followed by a third vehicle, and the first vehicle suddenly decelerates due to a crash, hard braking, malfunction, etc. A LiDAR system on the third vehicle will perform poorly in this scenario as, the LiDAR system may not detect that the first vehicle has decelerated rapidly in part because the second vehicle is between the first and third vehicles, especially when the second vehicle does not reduce its speed.

2. A known dangerous event at an intersection occurring, a vehicle changing lanes, animals on a thoroughfare, changes in lighting, emergency response vehicles being present on a thoroughfare, left-hand and right-hand turn scenarios.

3. Children boarding or unloading from a school bus in the opposite lane of traffic.

At the very least, in such scenarios, a LiDAR system may not detect the events associated with each scenario, which may result in an accident. Further, technologies such as LiDAR, even for the scenarios these technologies are designed for, are not readily available on many makes and models of vehicles, and/or cannot be easily added to vehicles without LiDAR.

SUMMARY

Some embodiments advantageously provide methods, systems, and apparatuses for leveraging wireless device, e.g., mobile phone, technologies, such as the audio, accelerometer and global position system (GPS) functionalities of many devices, and cellular network technologies to implement an advanced driver warning system that enables drivers to be more aware of hazardous road conditions. The solutions provide a way to reduce accidents and help drivers be informed of their surroundings.

According to an aspect, a network node configured to communicate with a set of wireless devices (WDs) is provided. The set of WDs includes at least a first WD configured to detect a traffic event and a group of other WDs. The network node comprises processing circuitry configured to determine a space corresponding to the first WD. The determined space has at least a dynamic dimension that is based at least on a vehicle traffic factor of a plurality of vehicle traffic factors associated with the first WD. Each of the WDs of the group of other WDs is determined to be within the space corresponding to the first WD. A first message is received from the first WD, where the first message is associated with the traffic event detected by the first WD. A second message is transmitted to each of the WDs of the group of other WDs based in part on the traffic event detected by the first WD.

In some embodiments, the first WD is associated with a first vehicle and the group of other WDs is associated with a group of other vehicles. Each of the WDs of the group of other WDs corresponds to a specific vehicle of the group of other vehicles. In addition, the determined space corresponds to the first WD is one of a first space corresponding at least to a first traveling parameter of a plurality of traveling parameters; a second space corresponding at least to a second traveling parameter of the plurality of traveling parameters; a third space corresponding at least to the first traveling parameter and the second traveling parameter of the plurality of traveling parameters; and a fourth space corresponding to the plurality of traveling parameters. The plurality of traveling parameters includes at least the first traveling parameter that is associated with a traveling direction of the group of other vehicles that is similar to a traveling direction of the first vehicle. The plurality of traveling parameters also includes the second traveling parameter that is associated with the first vehicle making a turn. The plurality of traveling parameters further includes the third traveling parameter that is associated with the traveling direction of the first vehicle being opposite to the traveling direction of the group of other vehicles.

In some other embodiments, the plurality of vehicle traffic factors includes at least one of a thoroughfare characteristic, a traveling speed, a traveling direction, and a weather parameter. In an embodiment, the first WD is located outside the space.

In another embodiment, the processing circuitry is further configured to establish a connection between the first WD and each of the WDs of the group of other WDs. The connection is at least one of a multi-point connection via the network node and a continuous connection that is maintained while the group of other WDs includes at least one WD. The processing circuitry is further configured to determine whether a latency of the established connection exceeds a predetermined latency threshold, where the predetermined latency threshold is based at least on a radio access technology. The processing circuitry is further configured to, when the latency exceeds the predetermined latency threshold, adjust the latency at least by transmitting a heartbeat signal every time a predetermined interval of time has elapsed.

In some embodiments, the processing circuitry is further configured to determine an absolute location of each of the WDs of the set of WDs. The absolute location of each of the WDs of the set of WDs includes a confidence space representing an absolute location uncertainty, and the confidence space has an absolute location boundary. The processing circuitry is further configured to determine a relative positioning structure including each WD of the set of WDs and a set of vectors. Each vector of the set of vectors extends and has a length from the absolute location boundary of one WD of the set of WDs to the absolute location boundary of another WD of the set of WDs. The group of other WDs includes a second WD and a third WD. The relative positioning structure includes at least one of (1) a first vector extending between the first WD and the second WD, and a second vector extending between the first WD and the third WD; (2) the first vector extending between the first WD and the second WD, the second vector extending between the second WD and the third WD; and (3) the first vector extending between the first WD and the second WD, the second vector extending between the second WD and the third WD, and a third vector extending from the first WD to the third WD. The processing circuitry is further configured to determine a relative position at least between the first WD and each of the WDs of the group of other WDs based on the relative positioning structure.

In some other embodiments, transmitting the second message to each of the WDs of the group of other WDs is further based on the determined relative position at least between the first WD and each of the WDs of the group of other WDs. In an embodiment, the processing circuitry is further configured to determine a position accuracy of each WD of the set of WDs based at least on an environmental condition. The processing circuitry is also configured to determine the confidence space and the absolute location boundary of each WD of the set of WDs, based on the determined positioning accuracy, and dynamically adjust the length each vector of the set of vectors based in part on the determined confidence space and the determined absolute location boundary of each WD.

In another embodiment, the processing circuitry is further configured to store information associated at least with the first WD and the group of other WDs in a first communication network and transfer the information from the first communication network to a second communication network geographically associated with the first WD. The processing circuitry is also configured to set up a fifth space based on determined space corresponding to the first WD and the transferred information.

In some embodiments, the first WD is associated at least with a sensor that reports a thoroughfare condition. In some other embodiments, the processing circuitry is further configured to determine and coordinate an accident-avoidance response between the first vehicle and the group of other vehicles based in part on the received first message from the first WD. The first message includes an indication that the first vehicle poses a threat to at least one of the vehicles of the group of other vehicles, and the transmitted second message to each of the WDs is further based on the coordinated accident-avoidance response.

In an embodiment, the transmitted second message to each of the WDs of the group of other WDs causes at least one WD of the group of other WDs to perform an action including one of generating one of an audio alert and a visual alert and causing an avoidance maneuver including one of a reduction of a speed, a change of lanes, a route change, and a transmittal of a warning message.

According to another aspect, a method is provided for a network node. The network node is configured to communicate with a set of wireless devices (WDs). The set of WDs includes at least a first WD configured to detect a traffic event and a group of other WDs. The method includes determining a space corresponding to the first WD. The determined space has at least a dynamic dimension that is based at least on a vehicle traffic factor of a plurality of vehicle traffic factors associated with the first WD. The method further includes determining that each of the WDs of the group of other WDs is within the space corresponding to the first WD and receiving a first message from the first WD. The first message is associated with the traffic event detected by the first WD. In addition, the method includes transmitting a second message to each of the WDs of the group of other WDs based in part on the traffic event detected by the first WD.

In some embodiments, the first WD is associated with a first vehicle and the group of other WDs is associated with a group of other vehicles. Each of the WDs of the group of other WDs corresponds to a specific vehicle of the group of other vehicles. In addition, the determined space corresponds to the first WD is one of a first space corresponding at least to a first traveling parameter of a plurality of traveling parameters; a second space corresponding at least to a second traveling parameter of the plurality of traveling parameters; a third space corresponding at least to the first traveling parameter and the second traveling parameter of the plurality of traveling parameters; and a fourth space corresponding to the plurality of traveling parameters. The plurality of traveling parameters includes at least the first traveling parameter that is associated with a traveling direction of the group of other vehicles that is similar to a traveling direction of the first vehicle. The plurality of traveling parameters also includes the second traveling parameter that is associated with the first vehicle making a turn. The plurality of traveling parameters further includes the third traveling parameter that is associated with the traveling direction of the first vehicle being opposite to the traveling direction of the group of other vehicles.

In some other embodiments, the plurality of vehicle traffic factors includes at least one of a thoroughfare characteristic, a traveling speed, a traveling direction, and a weather parameter. In an embodiment, the first WD is located outside the space.

In another embodiment, the method further includes establishing a connection between the first WD and each of the WDs of the group of other WDs. The connection is at least one of a multi-point connection via the network node and a continuous connection that is maintained while the group of other WDs includes at least one WD. The method also includes determining whether a latency of the established connection exceeds a predetermined latency threshold. The predetermined latency threshold is based at least on a radio access technology. The method further includes, when the latency exceeds the predetermined latency threshold, adjusting the latency at least by transmitting a heartbeat signal every time a predetermined interval of time has elapsed.

In some embodiments, the method further includes determining an absolute location of each of the WDs of the set of WDs. The absolute location of each of the WDs of the set of WDs includes a confidence space representing an absolute location uncertainty, and the confidence space has an absolute location boundary. The method also includes determining a relative positioning structure including each WD of the set of WDs and a set of vectors. Each vector of the set of vectors extends and has a length from the absolute location boundary of one WD of the set of WDs to the absolute location boundary of another WD of the set of WDs. The group of other WDs includes a second WD and a third WD, and the relative positioning structure includes at least one of (1) a first vector extending between the first WD and the second WD, and a second vector extending between the first WD and the third WD; (2) the first vector extending between the first WD and the second WD, the second vector extending between the second WD and the third WD; and (3) the first vector extending between the first WD and the second WD, the second vector extending between the second WD and the third WD, and a third vector extending from the first WD to the third WD. The processing circuitry is further configured to determine a relative position at least between the first WD and each of the WDs of the group of other WDs based on the relative positioning structure.

In some other embodiments, transmitting the second message to each of the WDs of the group of other WDs is further based on the determined relative position at least between the first WD and each of the WDs of the group of other WDs. In an embodiment, the method further includes determining a position accuracy of each WD of the set of WDs based at least on an environmental condition and determining the confidence space and the absolute location boundary of each WD of the set of WDs based on the determined positioning accuracy. The method also includes dynamically adjusting the length each vector of the set of vectors based in part on the determined confidence space and the determined absolute location boundary of each WD.

In another embodiment, the method further includes storing information associated at least with the first WD and the group of other WDs in a first communication network, transferring the information from the first communication network to a second communication network geographically associated with the first WD, and setting up a fifth space based on determined space corresponding to the first WD and the transferred information.

In some embodiments, the first WD is associated at least with a sensor that reports a thoroughfare condition. In some other embodiments, the method further includes determining and coordinating an accident-avoidance response between the first vehicle and the group of other vehicles based in part on the received first message from the first WD. The first message includes an indication that the first vehicle poses a threat to at least one of the vehicles of the group of other vehicles, and the transmitted second message to each of the WDs is further based on the coordinated accident-avoidance response.

In an embodiment, the transmitted second message to each of the WDs of the group of other WDs causes at least one WD of the group of other WDs to perform an action including one of generating one of an audio alert and a visual alert and causing an avoidance maneuver including one of a reduction of a speed, a change of lanes, a route change, and a transmittal of a warning message.

According to one aspect, a second wireless device (WD) configured to communicate with a network node, a first WD configured to detect a traffic event, and a group of other WDs is provided. The second WD comprises processing circuitry configured to receive a second message based in part on the traffic event detected by the first WD and a relative position at least between the first WD and the second WD and perform an action in response to the received second message.

In some embodiments, the action includes one of generating one of an audio alert and a visual alert and performing an avoidance maneuver including one of a reduction of a speed, a change of lanes, a route change, and a transmittal of a warning message.

In some other embodiments, the first WD and the second WD are located within a space corresponding to the first WD, the space has at least a dynamic dimension based at least on a vehicle traffic factor of a plurality of vehicle traffic factors associated with the first WD, and the plurality of vehicle traffic factors includes at least one of a thoroughfare characteristic, a traveling speed, a traveling direction, and a weather parameter.

In an embodiment, the first WD is associated with a first vehicle, the second WD is associated with a second vehicle, and the group of other WDs is associated with a group of other vehicles. Each of the WDs of the group of other WDs corresponds to a distinct vehicle of the group of other vehicles. The space corresponding to the first WD is one of a first space corresponding at least to a first traveling parameter of a plurality of traveling parameters; a second space corresponding at least to a second traveling parameter of the plurality of traveling parameters; a third space corresponding at least to the first traveling parameter and the second traveling parameter of the plurality of traveling parameters; and a fourth space corresponding to the plurality of traveling parameter. The plurality of traveling parameters includes at least the first traveling parameter associated with a traveling direction of the group of other vehicles and the second vehicle that is similar to a traveling direction of the first vehicle. The plurality of traveling parameters also includes the second traveling parameter associated with the first vehicle making a turn. The plurality of traveling parameters further includes the third traveling parameter associated with the traveling direction of the first vehicle that is opposite to the traveling direction of the group of other vehicles and the second vehicle.

In another embodiment, the processing circuitry is further configured to establish a connection between the second WD and at least the first WD. The connection is at least one of a multi-point connection via the network node and a continuous connection that is maintained with the second WD while the second WDs is in the space. The processing circuitry is further configured to, when a latency of the established connection exceeds a predetermined latency threshold, receive a heartbeat signal. The heartbeat signal is transmitted every time a predetermined interval of time has elapsed.

In some embodiments, the relative position is further between the first WD and each of the WDs of the group of other WDs based on a relative positioning structure. The relative positioning structure includes the first WD, the second WD, each WD of the group of other WDs, and a set of vectors. Each vector of the set of vectors extends and has a length between an absolute location boundary of one WD of any one of the first WD, the second WD, and the group of other WDs and an absolute location boundary of another WD of any one of the first WD, the second WD, and the group of other WDs. The group of other WDs includes a third WD. The relative positioning structure includes at least one of (1) a first vector extending between the first WD and the second WD, and a second vector extending between the first WD and the third WD; (2) the first vector extending between the first WD and the second WD, the second vector extending between the second WD and the third WD; and (3) the first vector extending between the first WD and the second WD, the second vector extending between the second WD and the third WD, and a third vector extending from the first WD to the third WD. The absolute location boundary is part of an absolute location of one of the first WD, the second WD, and each of the WDs of the group of other WDs. The absolute location of the first WD, the second WD, and each of the WDs of the group of other WDs includes a confidence space that represents an absolute location uncertainty. In addition, the confidence space has the absolute location boundary.

In some other embodiments, the confidence space and the absolute location boundary of each of the first WD, the second WD, and each WD of the group of other WDs is based on a determined positioning accuracy. The length of each vector of the set of vectors is dynamically adjustable based in part on the confidence space and the absolute location boundary of each WD.

In an embodiment, the space is a fifth space that is set up based at least on information stored in a first communication network and associated at least with the first WD, the second WD, and the group of other WDs. The information is transferred from the first communication network to a second communication network geographically associated with the first WD. In another embodiments, the first WD is associated at least with a sensor that reports a thoroughfare condition.

In some embodiments, the received second message is further based on a coordinated accident-avoidance response. The coordinated accident-avoidance response being between the first vehicle, the second vehicle, and the group of other vehicles based in part on a first message from the first WD, the first message being associated with the traffic event detected the first WD, the first message including an indication that the first vehicle poses a threat to at least one of the second vehicle and the vehicles of the group of other vehicles.

According to another aspect, a method for a second wireless device (WD) is provided. The second WD is configured to communicate with a network node, a first WD configured to detect a traffic event, and a group of other WDs. The method includes receiving a second message based in part on the traffic event detected by the first WD and a relative position at least between the first WD and the second WD and performing an action in response to the received second message.

In some embodiments, the action includes one of generating one of an audio alert and a visual alert and performing an avoidance maneuver including one of a reduction of a speed, a change of lanes, a route change, and a transmittal of a warning message.

In some other embodiments, the first WD and the second WD are located within a space corresponding to the first WD, the space has at least a dynamic dimension based at least on a vehicle traffic factor of a plurality of vehicle traffic factors associated with the first WD, and the plurality of vehicle traffic factors includes at least one of a thoroughfare characteristic, a traveling speed, a traveling direction, and a weather parameter.

In an embodiment, the first WD is associated with a first vehicle, the second WD is associated with a second vehicle, and the group of other WDs is associated with a group of other vehicles. Each of the WDs of the group of other WDs corresponds to a distinct vehicle of the group of other vehicles. The space corresponding to the first WD is one of a first space corresponding at least to a first traveling parameter of a plurality of traveling parameters; a second space corresponding at least to a second traveling parameter of the plurality of traveling parameters; a third space corresponding at least to the first traveling parameter and the second traveling parameter of the plurality of traveling parameters; and a fourth space corresponding to the plurality of traveling parameter. The plurality of traveling parameters includes at least the first traveling parameter associated with a traveling direction of the group of other vehicles and the second vehicle that is similar to a traveling direction of the first vehicle. The plurality of traveling parameters also includes the second traveling parameter associated with the first vehicle making a turn. The plurality of traveling parameters further includes the third traveling parameter associated with the traveling direction of the first vehicle that is opposite to the traveling direction of the group of other vehicles and the second vehicle.

In another embodiment, the method further includes establishing a connection between the second WD and at least the first WD. The connection is at least one of a multi-point connection via the network node and a continuous connection that is maintained with the second WD while the second WDs is in the space. The method further includes, when a latency of the established connection exceeds a predetermined latency threshold, receiving a heartbeat signal, the heartbeat signal is transmitted every time a predetermined interval of time has elapsed.

In some embodiments, the relative position is further between the first WD and each of the WDs of the group of other WDs based on a relative positioning structure. The relative positioning structure includes the first WD, the second WD, each WD of the group of other WDs, and a set of vectors. Each vector of the set of vectors extends and has a length between an absolute location boundary of one WD of any one of the first WD, the second WD, and the group of other WDs and an absolute location boundary of another WD of any one of the first WD, the second WD, and the group of other WDs. The group of other WDs includes a third WD. The relative positioning structure includes at least one of (1) a first vector extending between the first WD and the second WD, and a second vector extending between the first WD and the third WD; (2) the first vector extending between the first WD and the second WD, the second vector extending between the second WD and the third WD; and (3) the first vector extending between the first WD and the second WD, the second vector extending between the second WD and the third WD, and a third vector extending from the first WD to the third WD. The absolute location boundary is part of an absolute location of one of the first WD, the second WD, and each of the WDs of the group of other WDs. The absolute location of the first WD, the second WD, and each of the WDs of the group of other WDs includes a confidence space that represents an absolute location uncertainty. In addition, the confidence space has the absolute location boundary.

In some other embodiments, the confidence space and the absolute location boundary of each of the first WD, the second WD, and each WD of the group of other WDs is based on a determined positioning accuracy. The length of each vector of the set of vectors is dynamically adjustable based in part on the confidence space and the absolute location boundary of each WD.

In an embodiment, the space is a fifth space that is set up based at least on information stored in a first communication network and associated at least with the first WD, the second WD, and the group of other WDs. The information is transferred from the first communication network to a second communication network geographically associated with the first WD. In another embodiments, the first WD is associated at least with a sensor that reports a thoroughfare condition.

In some embodiments, the received second message is further based on a coordinated accident-avoidance response. The coordinated accident-avoidance response being between the first vehicle, the second vehicle, and the group of other vehicles based in part on a first message from the first WD, the first message being associated with the traffic event detected the first WD, the first message including an indication that the first vehicle poses a threat to at least one of the second vehicle and the vehicles of the group of other vehicles.

Some other embodiments of some other aspect use a sensor located in one place, such as a wireless device, e.g., a user equipment (UE), a camera, a light pole, etc., to send through a network an audible alert to a driver in another place to warn them about a hazardous condition that they may not have yet detected. The ability to inform the driver in a timely matter may be useful in various embodiments, as late information in some use cases is of limited value.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
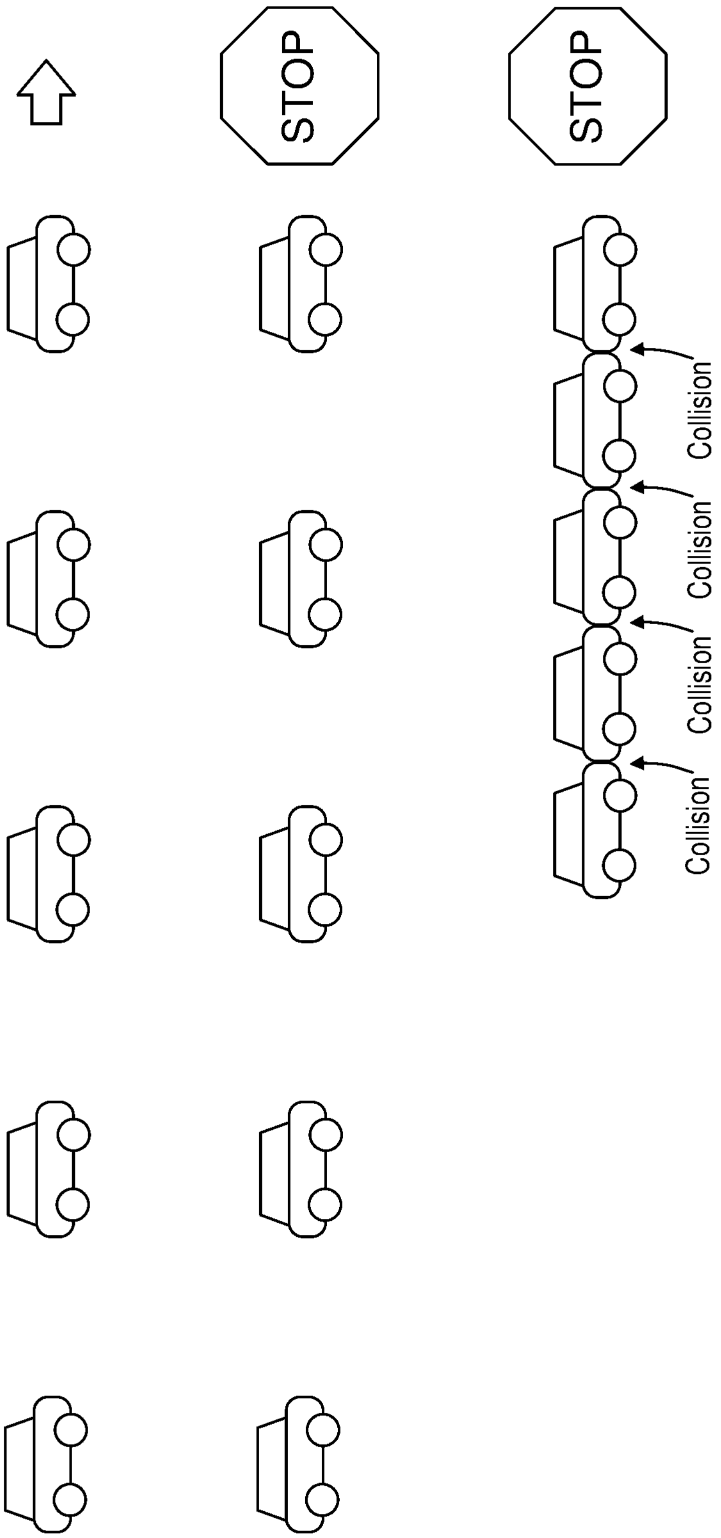
FIG. 1 is a schematic diagram of example scenarios of incidents and/or accidents that may be prevented according to the principles in the present disclosure.

Before describing in detail example embodiments, it is noted that the embodiments reside primarily in combinations of apparatus components and processing steps related to leveraging existing mobile phone technologies such as the audio, accelerometer and GPS functionalities, and cellular network technologies to implement an advanced driver warning system that enables drivers to be more aware of hazardous road conditions. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc. In some embodiments, the WD may be a sensor, include a sensor, or included as part of a vehicle. Thus, descriptions regarding WD herein should be understood as being the actual vehicle, in which the vehicle is equipped with the WD components described below and configured to perform the WD functions described below.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for leveraging mobile phone technologies such as the audio, accelerometer and GPS functionalities, and cellular network technologies to implement an advanced driver warning system that enables drivers to be more aware of hazardous road conditions and reduce accidents.

Referring now to the drawing figures, in which like elements are referred to by like reference numerals, there is shown in FIG. 1 a schematic diagram of example scenarios of incidents and/or accidents that may be prevented according to the principles in the present disclosure. Sudden rapid deceleration events among closely packed vehicles trigger chain reactions which result in small and large multi-vehicle accidents occurring relatively frequently. For example, some vehicles in a group of vehicles traveling in a direction may be exposed to a collision when the first vehicle in the group stops. These accidents endanger lives, are demanding of first responders, and create large loss scenarios for insurers. The causes of such accidents are well known, i.e., following another vehicle too closely, driving while distracted, poor visibility, etc. Embodiments described herein endeavor to reduce or prevent accidents by making drivers more informed.

Figure 2:
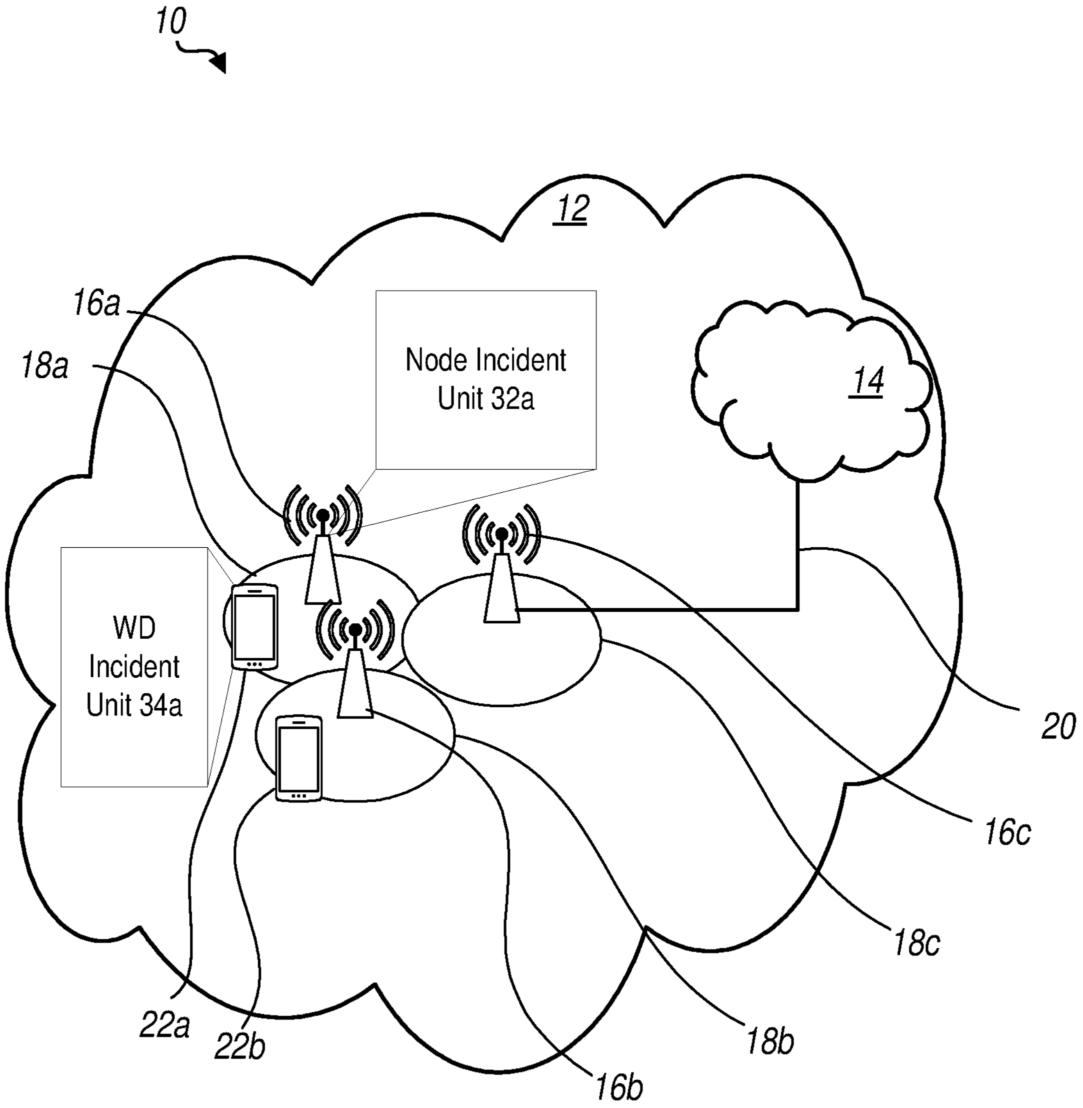
FIG. 2 is a schematic diagram of an example network architecture illustrating a communication system according to the principles in the present disclosure.

FIG. 2 is a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes **16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first WD 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16**.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN. In addition, it is contemplated that a network node 16 may be in simultaneous communication and/or configured to communicate with more than one WD 22 at the same time. Further, the communication system 10 is configured so that any WD 22 may communicate with another WD 22 via the network node 16 or directly.

A network node 16 is configured to include a node incident unit 32, e.g., network node 16 includes node incident unit 32*a*, which is configured to detect, and receive and send notifications regarding, hazardous traffic conditions. A wireless device 22 is configured to include a WD incident unit 34, e.g., wireless device 22*a* includes WD incident unit 34*a*, which is configured to detect, and receive and send notifications regarding, hazardous traffic conditions as discussed in detail below.

Example implementations, in accordance with an embodiment, of the WD 22 and network node 16 discussed in the preceding paragraphs will now be described with reference to FIG. 3.

The communication system 10 further includes a network node 16 provided in a communication system 10 and including hardware 44 enabling it to communicate with the WD 22. The hardware 44 may include a communication interface 46 for setting up and maintaining a wired or wireless connection with an interface of a different communication device of the communication system 10, as well as a radio interface 48 for setting up and maintaining at least a wireless connection, e.g., 56, 58, with a WD 22 located in a coverage area 18 served by the network node 16. The radio interface 48 may be formed as or may include, for example, one or more RF transmitters, one or more RF receivers, and/or one or more RF transceivers.

In the embodiment shown, the hardware 44 of the network node 16 further includes processing circuitry 50. The processing circuitry 50 may include a processor 54 and a memory 52. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 54 may be configured to access (e.g., write to and/or read from) the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 52, or stored in external memory (e.g., database, storage array, network storage device, etc.) accessible by the network node 16 via an external connection. The software 42 may be executable by the processing circuitry 50. The processing circuitry 50 may be configured to control any of the methods and/or processes described herein and/or to cause such methods, and/or processes to be performed, e.g., by network node 16. Processor 54 corresponds to one or more processors 54 for performing network node 16 functions described herein. The memory 52 is configured to store data, programmatic software code and/or other information described herein. In some embodiments, the software 42 may include instructions that, when executed by the processor 54 and/or processing circuitry 50, causes the processor 54 and/or processing circuitry 50 to perform the processes described herein with respect to network node 16. For example, processing circuitry 50 of the network node 16 may include node incident unit 32 configured to receive and send notifications regarding hazardous traffic conditions.

The communication system 10 further includes the WD 22 already referred to. WD 22 may include components/elements that are the same as or similar to the components shown for any one of WD 22*a* or WD 22*b*. For the sake of simplicity and ease of understanding, the components/elements of WD 22 will be discussed in reference to the component/elements of WD 22*b* shown in this figure. The WD 22 may have hardware 28 that may include a radio interface 30 configured to set up and maintain a wireless connection 58 with a network node 16 serving a coverage area 18 in which the WD 22 is currently located. The radio interface 30 may be formed as or may include, for example, one or more RF transmitters, one or more RF receivers, and/or one or more RF transceivers.

The hardware 28 of the WD 22 further includes processing circuitry 36. The processing circuitry 36 may include a processor 40, memory 38, and, optionally, sensor 60. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Sensor 60 (shown as 60*b* for WD 22*b*) may be configured to detect any hazardous thoroughfare condition. Nonlimiting examples of hazardous thoroughfare conditions that may be detected by sensor 60 include hard braking, school bus stop sign deployed, an adverse event at an intersection. Sensor 60 may also be configured to detect any other condition.

Thus, the WD 22 may further comprise software 26, which is stored in, for example, memory 38 at the WD 22, or stored in external memory (e.g., database, storage array, network storage device, etc.) accessible by the WD 22. The software 26 may be executable by the processing circuitry 36. The software 26 may include a client application 24. The client application 24 may interact with the user to generate the user data that it provides.

The processing circuitry 36 may be configured to control any of the methods and/or processes described herein and/or to cause such methods, and/or processes to be performed, e.g., by WD 22. The processor 40 corresponds to one or more processors 40 for performing WD 22 functions described herein. The WD 22 includes memory 38 that is configured to store data, programmatic software code and/or other information described herein. In some embodiments, the software 26 and/or the client application 24 may include instructions that, when executed by the processor 40 and/or processing circuitry 36, causes the processor 40 and/or processing circuitry 36 to perform the processes described herein with respect to WD 22. For example, the processing circuitry 36 of the wireless device 22 may include a WD incident unit 34 (shown as 34*b* for WD 22*b*) configured to detect and receive and send notifications regarding hazardous traffic conditions.

WD 22*a* is part of the communication system 10 and includes a WD incident unit 34*a* and, optionally, a sensor 60*a*. WD incident unit 34*a* is configured to perform similar or the same processes/functions as WD incident unit 34 described above, i.e., detect, and receive and send notifications regarding, hazardous traffic conditions. Sensor 60*a* is configured to perform similar or the same functions as 60 described above, i.e., detect any hazardous thoroughfare condition and/or any other condition. In addition, WD 22*a* may include some or all of the elements/components of WD 22, such as hardware 28, radio interface 30, processing circuitry 36, memory 38, processor 40, software 26, and/or client application 24. Accordingly, WD 22*a* may perform some or all processes that are similar or the same as WD 22, including setting up and maintaining the wireless connection 56 with the network node 16 serving a coverage area 18 in which the WD 22*b* is currently located.

WD 22*b* is part of the communication system 10 and includes a WD incident unit 34*b* and, optionally, a sensor 60*b*. WD incident unit 34*b* is configured to perform similar or the same processes/functions as WD incident unit 34 described above, i.e., detect, and receive and send notifications regarding, hazardous traffic conditions. Sensor 60*b* is configured to perform similar or the same functions as 60 described above, i.e., detect any hazardous thoroughfare condition and/or any other condition. In addition, WD 22*b* may include some or all of the elements/components of WD 22, such as hardware 28, radio interface 30, processing circuitry 36, memory 38, processor 40, software 26, and/or client application 24. Accordingly, WD 22*b* may perform some or all processes that are similar or the same as WD 22, including setting up and maintaining the wireless connection 58 with the network node 16 serving a coverage area 18 in which the WD 22*b* is currently located.

WD incident units 34*a* and 34*b* may be referred to collectively herein as WD incident unit 34. Similarly, sensors 60*a* and 60*b* may be referred to collectively as sensor 60.

Figure 3:
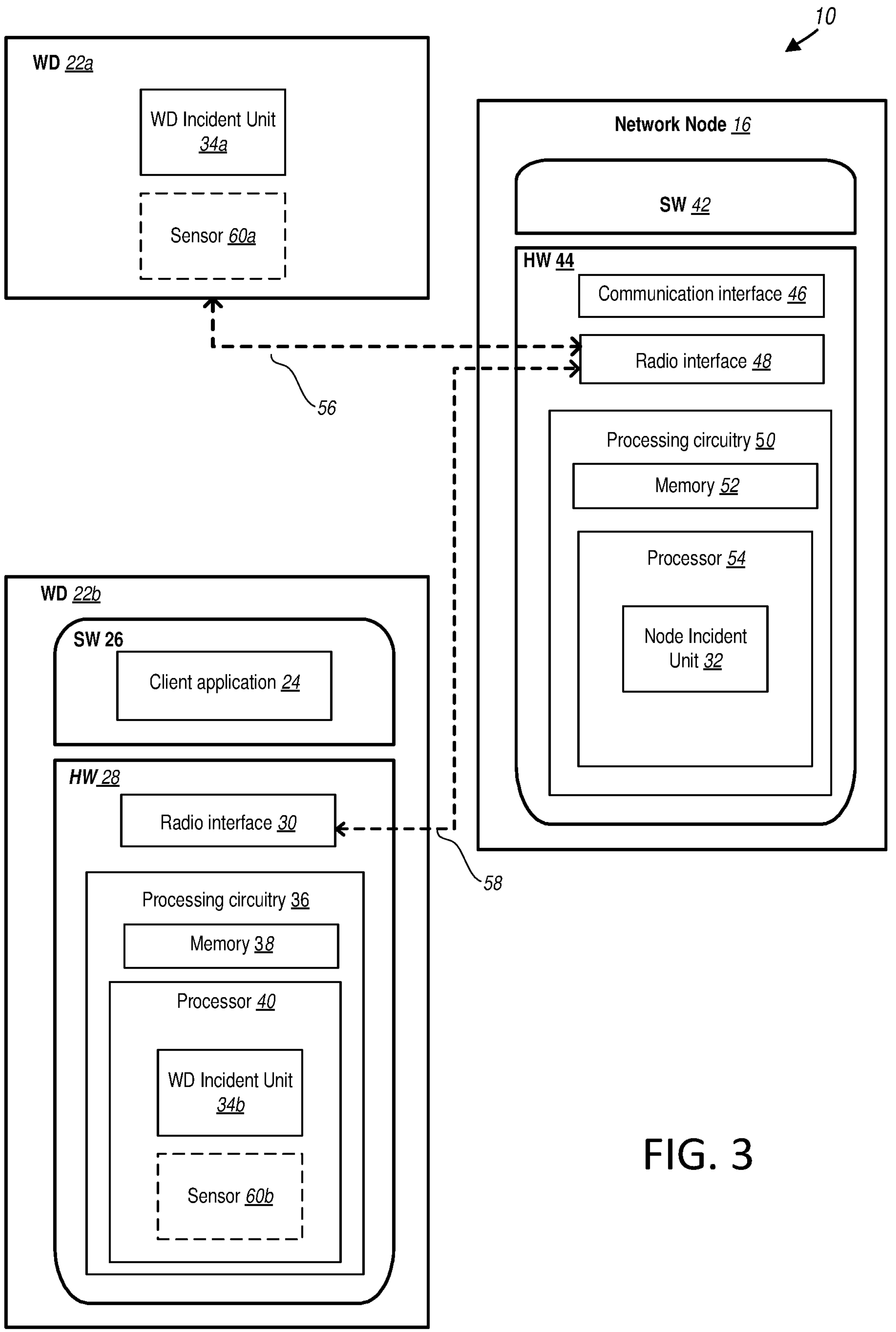
FIG. 3 is a block diagram of a network node communicating with a wireless device over an at least partially wireless connection according to some embodiments of the present disclosure.

In some embodiments, the inner workings of the network node 16 and WD 22 may be as shown in FIG. 3 and independently, the surrounding network topology may be that of FIG. 2.

In some embodiments, any of the WDs 22 may be configured to, and/or comprises a radio interface 30 and/or processing circuitry 36 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as node incident unit 32, and WD incident unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
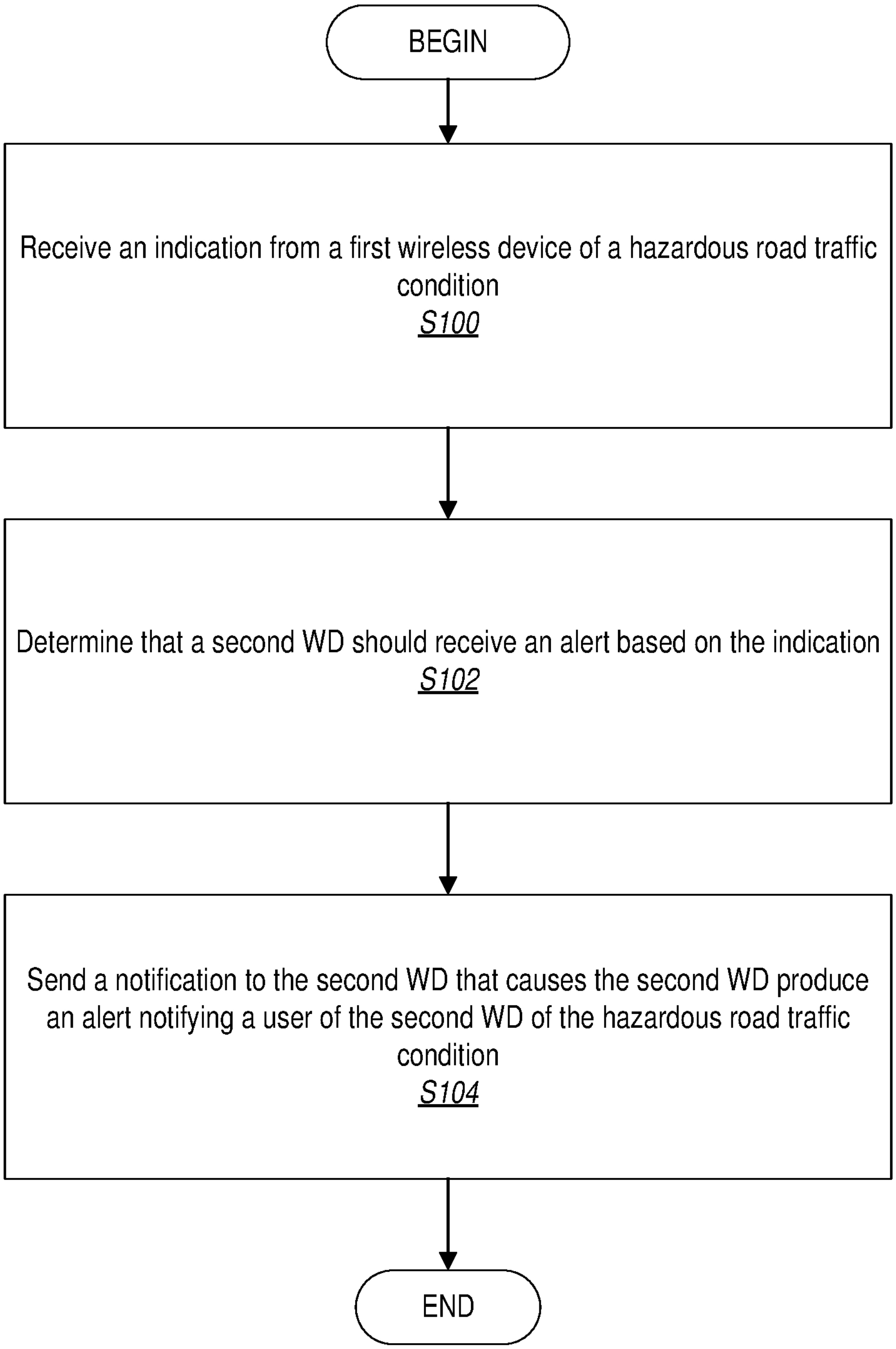
FIG. 4 is a flowchart of an example process in a network node for detecting and providing notification of hazardous road conditions according to some embodiments of the present disclosure.

FIG. 4 is a flowchart of an example process in a network node 16 for detecting and providing notification of hazardous road conditions according to some embodiments of the present disclosure. One or more Blocks and/or functions performed by network node 16 may be performed by one or more elements of network node 16 such as by node incident unit 32 in processing circuitry 50, processor 54, communication interface 46, radio interface 48, etc. In one or more embodiments, network node 16 such as via one or more of processing circuitry 50, processor 54, radio interface 48 and communication interface 46 is configured to receive (Block S100) an indication from the first wireless device of a hazardous road traffic condition. In one or more embodiments, network node 16 such as via one or more of processing circuitry 50, processor 54, radio interface 48 and communication interface 46 is configured to determine (Block S102) that a second WD 22 should receive an alert based on the indication. In one or more embodiments, network node 16 such as via one or more of processing circuitry 50, processor 54, radio interface 48 and communication interface 46 is configured to send (Block S104) a notification to the second WD 22 that causes the second WD 22 produce an alert notifying a user of the second WD 22 of the hazardous road traffic condition.

In one or more embodiments, the first WD 22 is associated with a first vehicle and the second WD 22 is associated with a second vehicle. In one or more embodiments, wherein the network node 16 and/or the radio interface 48 and/or the processing circuitry 50 is further configured to determine that the hazardous road traffic condition is a threat to a vehicle associated with the second WD 22 and coordinate an accident avoidance response between a plurality of vehicles if the hazardous road traffic condition is determined to be a threat. In one or more embodiments, the network node 16 and/or the radio interface 48 and/or the processing circuitry 50 is further configured to receive sensor information regarding a potentially hazardous road traffic condition; determine if the sensor information is indicative of a potential threat to a WD 22 being monitored by the network node 16; and if the sensor information is indicative of a potential threat to a WD 22 being monitored by the network node 16, notify the threatened WD 22 of the potential threat. In one or more embodiments, the alert is a voice command to initiate breaking. In one or more embodiments, the alert triggers an automatic braking function of a vehicle associated with the second WD 22.

Figure 5:
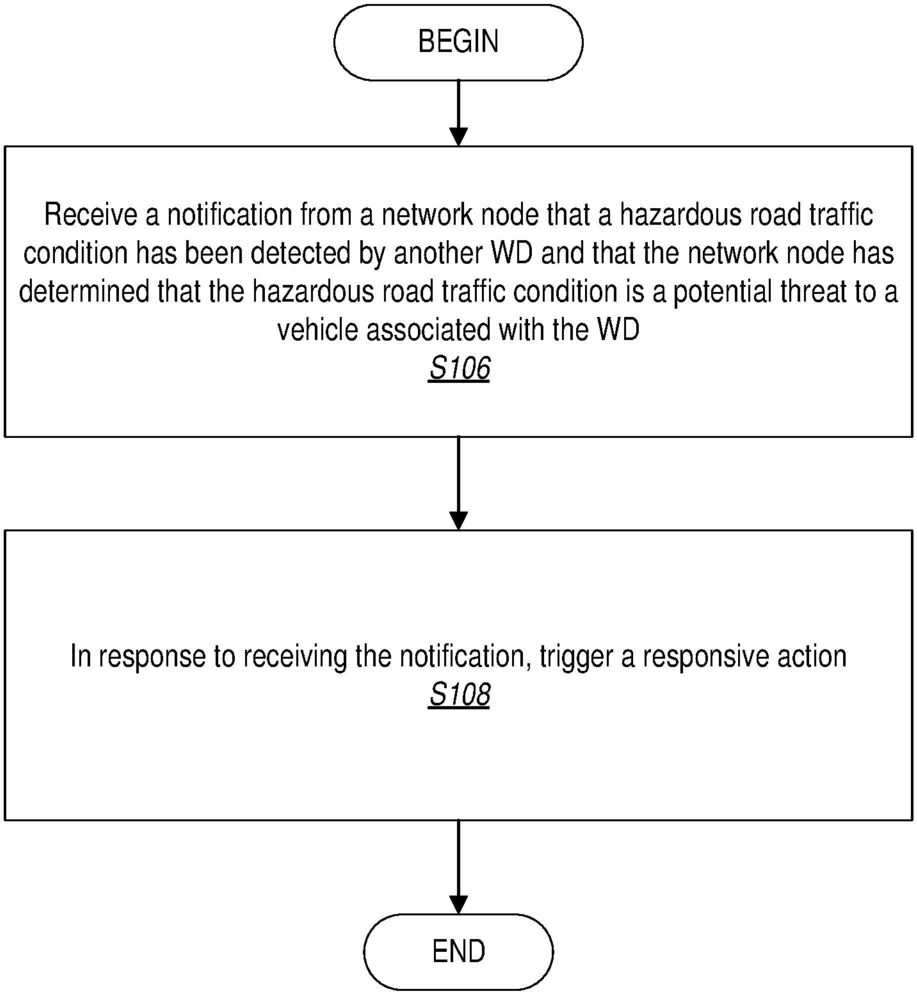
FIG. 5 is a flowchart of an example process in a wireless device for detecting and providing notification of hazardous road conditions according to some embodiments of the present disclosure.

FIG. 5 is a flowchart of an example process in a wireless device 22*b* according to some embodiments of the present disclosure. One or more Blocks and/or functions performed by wireless device 22*b* may be performed by one or more elements of wireless device 22*b* such as by WD incident unit 34*b* in processing circuitry 36, processor 40, radio interface 30, etc. In one or more embodiments, WD 22*b* such as via one or more of processing circuitry 36, processor 40 and radio interface 30 is configured to receive (Block S106) a notification from the network node 16 that a hazardous road traffic condition has been detected by another WD 22 and that the network node 16 has determined that the hazardous road traffic condition is a potential threat to a vehicle associated with the WD 22*b*.

In one or more embodiments, wireless device 22*b* such as via one or more of processing circuitry 36, processor 40 and radio interface 30 is configured to, in response to receiving the notification, trigger (Block S108) a responsive action.

In one or more embodiments, the wireless device 22*b* such as via one or more of processing circuitry 36, processor 40 and radio interface 30 is further configured to detect a hazardous road traffic condition and send a notification to the network node 16 of the hazardous road traffic condition. In one or more embodiments, the other WD 22 is associated with a second vehicle. In one or more embodiments, the wireless device 22*b* such as via one or more of processing circuitry 36, processor 40 and radio interface 30 is further configured to receive sensor information from a sensor 60 regarding a potentially hazardous road traffic condition and send a notification to the network node 16 of the hazardous road traffic condition. Having described the general process flow of arrangements of the disclosure and having provided examples of hardware and software arrangements for implementing the processes and functions of the disclosure, the sections below provide details and examples of arrangements for leveraging mobile phone technologies and cellular network technologies to implement advanced driver warning systems that enable drivers to be more aware of hazardous road conditions.

Figure 6:
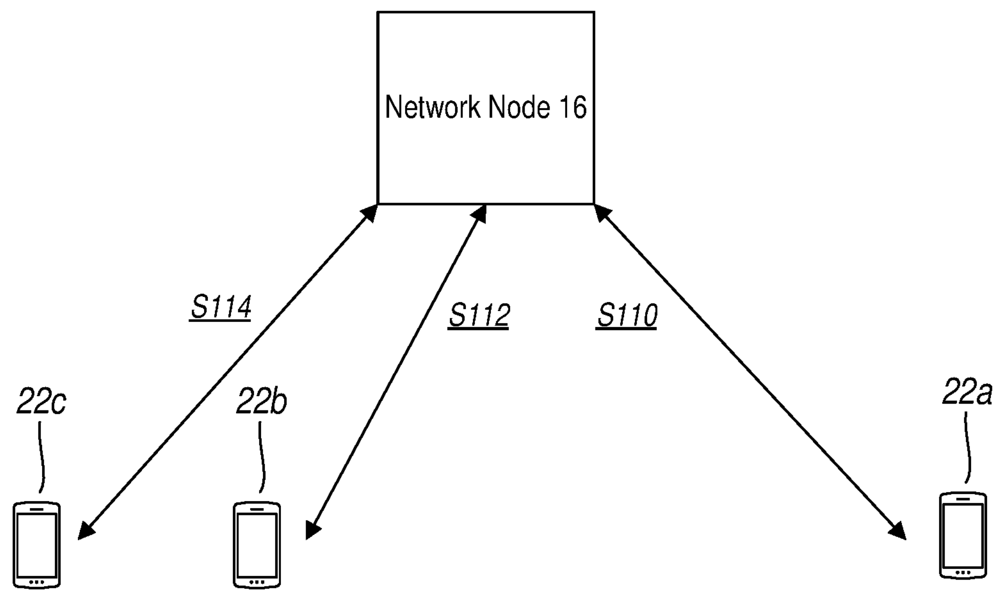
FIG. 6 is a diagram of an example process for detecting and providing notification of hazardous road conditions according to some embodiments of the present disclosure.

For example, some embodiments may be implemented using a plurality of WDs 22 and at least a network node 16 as shown in FIG. 6, which illustrates an example process for detecting and providing notification of hazardous road conditions. More specifically, the example process includes a first WD 22*a* with sensor 60*a*, a second WD 22*b*, and the network node 16. The second WD 22*b*, at least in this example, may represent one or many WDs 22. Thus, the term "second" is not limited to a single WD 22 and can represent a group of WDs 22 that do not include the first WD 22*a*. Network node 16 includes a dispatch system, which may be hosted in a communication network, e.g., hosted privately, in a cloud network, in a mobile network operator's edge cloud, etc.

The dispatch system in network node 16 may include one or more computing devices, e.g., servers, with corresponding communication interfaces to allow communication with network nodes 16 and WDs 22, as described herein. The computing devices comprising the dispatch system may include processing circuitry, comprising memory and one or more processors, along with firmware and/or software for carrying out the functions described herein with respect to the dispatch system. It is also contemplated that the dispatch system can be implemented as a distributed computing system and is not limited to being implemented in a single physical device and/or at a single location.

In one example embodiment, the following steps may be included. At step S110, WD 22*a*, such as via WD incident unit 34*a* and/or sensor 60*a*, detects a hazardous road traffic condition such as hard braking, school bus stop sign deployed, an adverse event at an intersection, i.e., a left-hand turn, emergency vehicle, animal, speeding, changing lanes, etc.

WD 22*a*, such as via radio interface 30, then sends a notification of the event to the network node 16. The notification may include additional data relevant to the event such as the time, location, event nature, etc. and/or relevant to any additional nearby WDs 22 available to the network node 16 as discussed herein.

The network node 16 processes the event and sends notifications, at steps S112 and S114, to relevant WDs 22, such as WD 22*b* and 22*c*. Accordingly, the user(s) associated with each WD 22 may receive the notifications. Latency of processing and reaction time can be adjusted according to the nature of the application and/or detected events as well as the available systems' functionality. The network 16 may also assume control of the WDs 22, sensors 60, or other systems, e.g., automated systems, to prompt the collection of additional data and/or facilitate a beneficial response to an event as described herein.

Further, at steps S112 and S114, the other WDs 22*b* and 22*c* receive notification from the network node 16 and may create an alert notifying the user associated with each of WDs 22*b* and 22*c*, such as a driver, of the hazardous road condition. The alert may be a familiar sound to trigger breaking, a voice command, or similar. In addition to an alert, the other WDs 22*b* and 22*c* may trigger a responsive action such as automatically initiating braking in a vehicle associated with, or comprising, one of the WDs 22*b* and 22*c* in response to the notification from the network node 16 in an attempt to minimize the effect of the hazardous road condition. The decision to trigger an alert or responsive action may be may by any of the elements of the system such network node 16, including the dispatch system, or any of the WDs 22.

In various embodiments, the sensor 60 may be a stationary sensor such as a LiDAR, camera, infrared detector, motion sensor, traffic monitoring system, etc., that is positioned on a stationary object such as lamp post, streetlight, light bulb, access door, entry gate, road surface or other area where the sensor 60 can detect vehicle motions and/or other traffic or environmental conditions. Artificial intelligence software and hardware in the WDs 22, network node 16 and/or sensors 60 may use pattern recognition algorithms to process sensor inputs and received notifications to identify relevant events and emergency situations and formulate appropriate responsive actions. In various embodiments, the network node 16 may assume control of any one of sensors 60, WDs 22 or other stationary objects to facilitate a favorable response. For example, network node 16 may activate additional lighting or sensors in the vicinity of an event. As a further example, network node 16 may assume control of a traffic light or other signal and prompt a desired output to facilitate the avoidance of an accident. Network node 16 may also prompt the recording of additional data by WDs 22 or sensors 60 in response to the detection of an incident of interest. For example, network node 16 may take interact with sensors 60 such as license plate readers and cameras in the vicinity to prompt the recording of additional data relevant to the event or redirect a camera or other sensor 60*s* to focus on an area of interest.

As a result of the interactions of the sensors 60, network node 16 and WDs 22, the drivers of the vehicles associated with the WDs 22 are now much more informed and can make safer driving decisions. Further, in some embodiments, defensive responsive measures can be taken without the need of any user/driver input.

As described above, the network node 16 dispatches events to relevant users such that the WDs 22 receive timely notification of the event. Also during steps S112 and S114, the network node 16 and/or the WD 22 receiving the notification of the event makes a decision to alert a user of the corresponding WD 22, such as a driver, or to take responsive action based on the relevance of the event, e.g., by analyzing a proximity, timestamp, etc. The latency of steps S110-S114 shown in FIG. 6 may or may not be critical. An embodiment may take advantage of advances in wireless network, e.g., $3^{rd}$ Generation Partnership Project (3GPP) 5G protocol features and network topologies to adjust latency.

Nonlimiting examples of alerts include audible alerts, such as a beep, or voice notification, or a combination of an audible and a visual alert, or an alert involving haptic feedback. However, alerts are not limited to the alerts described above and may include any other alert. Responsive actions may include but are not limited to initiating breaking or activating other automated features of an associated vehicle as described herein.

Embodiments may operate at a scale such that some portions of the network node 16 operate in one communication network, e.g., a public network cloud, while other portions operate in another communication network, e.g., a private network cloud with a potentially lower latency. These are generalized as network node 16 in FIG. 6, but the dispatch system in network node 16 could be hosted/bridged across several communication networks, including public, private and edge cloud services.

Figure 7:
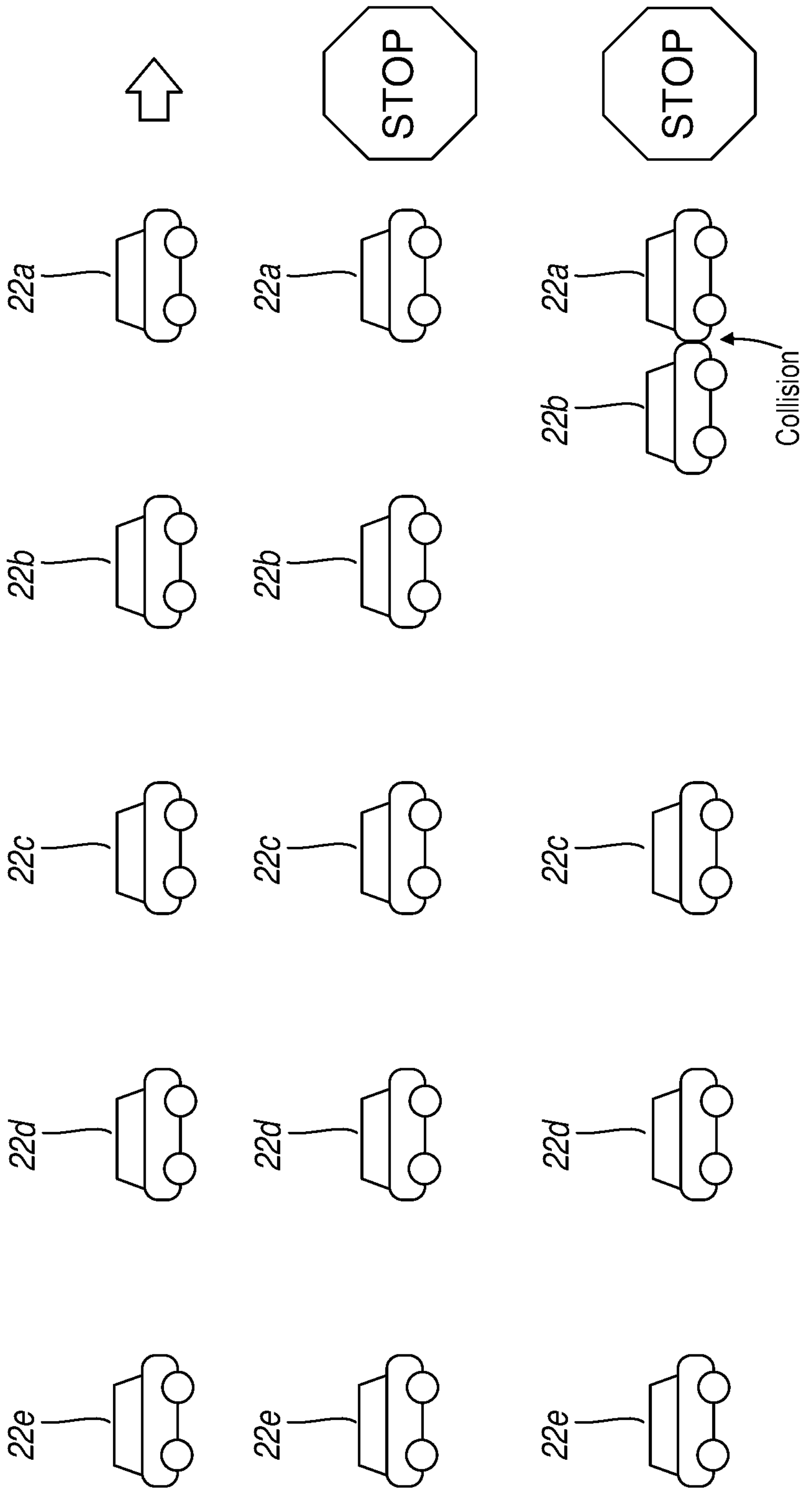
FIG. 7 is a diagram of another example process for detecting and providing notification of hazardous road conditions according to some embodiments of the present disclosure.

FIG. 7 is a diagram of another example process for detecting and providing notification of hazardous road conditions according to some embodiments of the present disclosure. The example process includes a plurality of WDs 22, vehicles, and drivers. For this example, each WD 22 is associated with a specific vehicle and a specific driver. More specifically, the first vehicle, of the lead driver, associated with WD 22*a*, is progressing down the road when WD 22*a* encounters a stopping situation. WD 22*a* immediately sends notification of the stopping event to the network node 16 in response to an indication from a braking system associated with WD 22*a*. Drivers in the second, third, fourth, and fifth vehicles, i.e., WDs 22*b*-22*e* may then be notified instantly by the network node 16 that the driver should brake, thereby reducing the likelihood of an accident. In addition, the LiDAR or braking system of any one of the WDs 22*b*-22*e*, or the vehicle associated with any one of WDs 22*b*-22*e*, may also directly notify the network node of the braking event. This interactivity can be carried out among the group of WDs 22*a*-22*e* so that the WDs 22 react as a coordinated group to any detected hazardous traffic situations. In addition, network node 16 may coordinate responsive interactions between the WDs 22 such that one WD 22 (or the vehicle/driver associated with such WD) knows that another vehicle associated with another WD 22 is going to brake prior to the other WD 22 actually initiating braking or any other type of responsive action. As a result, drivers are no longer limited to monitoring the tail-lights immediately in front of them, which subjects the driver to reaction delay stacking, which has been well recognized as approximately 2 seconds per each car.

In various embodiments, WDs 22 may represent the autonomous driving systems of a series of vehicles. Upon detection of a relevant event, the network node 16 may assume control of the autonomous driving system of each of, or some of, the WDs 22 to coordinate defensive action among the vehicles, e.g., WD 22*c* is controlled to brake and turn left, while WD 22*d* is controlled to brake and turn right, thereby avoiding a collision between WD 22*a* and Wd 22*b*. In doing so, the network node 16 may prioritize the safety of the relevant vehicles represented by the WDs 22, e.g., protect a school bus or de-prioritize a speeding, fleeing suspect. Upon resolution of the event, the network node may rapidly release control of the respective vehicles back to their operators.

While the WDs 22 are shown communicating through each other through the network node 16, the WDs 22 may communication directly with each other and/or function as a mesh network. In such embodiments, the network node 16 may serve as a virtual dispatch system that resides in a distributed fashion on the WDs 22 themselves. WDs 22*a*-22*e* may represent members enrolled in a service, e.g., offered by an operator of the network node 16 for a monthly fee to members that that have agreed to the conditions of the service, or may represent random devices accessible to the network node 16.

Space Associated with Main User (MU)

Figure 8:
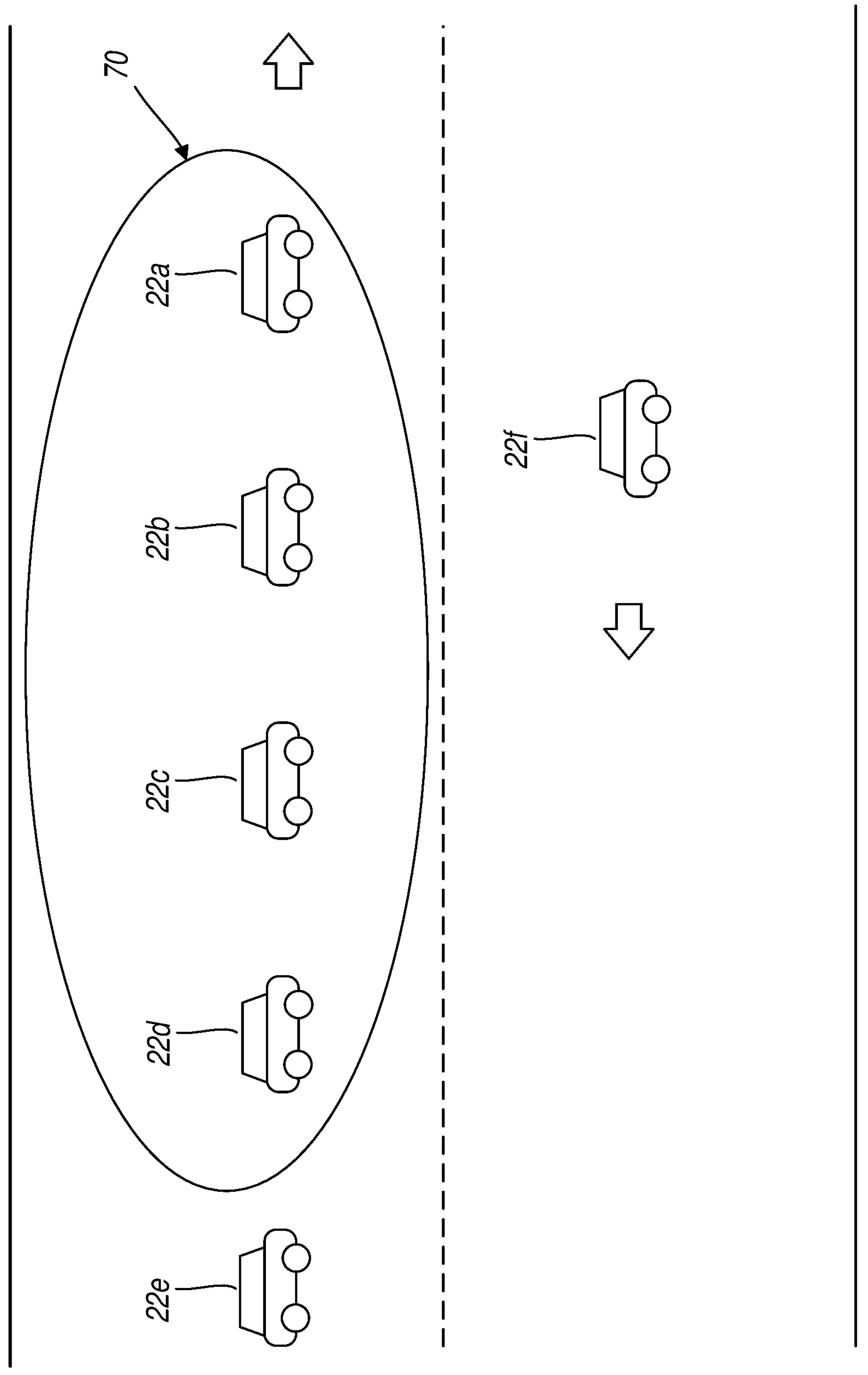
FIG. 8 is a diagram of an example process of determining a space that includes at least one WD 22 according to the principles of the present disclosure.

The network node 16 may determine a space to detect and maintain a targeted group of users, which may be based at least on a driving condition to be avoided or communicated. FIG. 8 shows an example process of determining a space that includes at least one WD 22 according to the principles of the present disclosure. More specifically, FIG. 8 shows a plurality of vehicles and WDs 22. For this example, each WD 22 is associated with a specific vehicle and a specific driver or a specific user of the WD 22. The plurality of WDs 22 includes WDs 22*a*-22*f* on a thoroughfare, where WDs 22*a*-22*e* are associated with vehicles traveling in the same lane and in the same direction. WD 22*f* is associated with a vehicle traveling in a different lane and in an opposite direction to vehicles associated with WDs 22*a*-22*e*.

The network node 16 determines the space 70. Nonlimiting examples of the space include a 2-dimensional shape, e.g., an ellipse, or a 3-dimensional space, a sphere, or an elliptical volume. However, the space may be any kind of space and is not limited to the examples described above. The dimensions of the space 70 may be dynamically adjusted based on a factor or a plurality of factors.

In this nonlimiting example, space 70 includes WDs 22*a*-22*d* and is determined by the network node 16. The space 70 may be dimensioned dynamically or statically based on anyone of the following:

1. The size and type of thoroughfare, e.g., single lane vs multi-lane, number of lanes, one-way vs more than one way;
2. The speed of vehicle associated with the corresponding WD 22;
3. Location of one or more WDs 22; and
4. Weather conditions, including past weather conditions, current weather conditions, forecasted weather conditions. Taking weather conditions into consideration allows the network node 16 to determine expected actions, such as expected increased braking distance in different weather conditions or conditions created by different weather conditions, including but not limited to rain, freezing rain, snow, icy roads, fog, poor visibility, temperatures below a predetermined number of degrees of temperature.

The determined space 70 may include a WD 22*a* associated with a user that is determined to be a main user (MU). In some examples, WD 22*a* may be considered the MU. In addition, the space 70 may be centered around the WD 22*a*, or, alternatively, the space 70 may include WD 22*a* without the WD 22*a* being in the center of the space. Further, any WD 22 may be tracked as either one of, or both of, a MU and user.

The space 70 and/or the dimensions of the space 70 may be used to determine which WDs 22 form a "zone of influence," i.e., a space 70 that includes WDs 22 other than WD 22*a* that are notified when an event is detected by the WD 22*a*. As WDs 22 enter the space, the network node 16 may establish a connection, e.g., via an edge server, between WD 22*a*, i.e., the MU, and the other WDs 22 that have entered the space, i.e., WDs 22*b*-22*d*. The connection may be a point to multi-point connection and may be maintained continuously until there are no WDs 22 other than WD 22*a*, i.e., associated with the MU. The established connection is kept continuously and enables ultra-low latency notification in real-time of events detected by the WD 22*a* to other WDs 22 in the space. Although this example has been described as the WD 22*a* detecting and sending messages to the other WDs 22 in the space, any one of WDs 22*b*-22*d* may also detect and send messages to other WDs 22 in the space, including WD 22*a*. In a nonlimiting example, WD 22*b* may detect event and/or send a message to WD 22*a* and/or WD 22*c*.

The connection may be achieved in the following manner. The network node 16 is network aware and may periodically test end-to-end latency, e.g., WD 22*a* to network node 16 to other WDs 22 and/or vice versa). Should the latency exceed a predetermined threshold, the network node 16 sending heartbeat signals at regular intervals to lower latency of notifications, such as notification that are critical. Different network access type, e.g., 3G, LTE, NR, may trigger different latency measurements and/or thresholds. The heartbeat may change in frequency or stop if either latency thresholds can be met in the absence of the heartbeat.

In addition, a WD 22 is not limited to being associated with only one space. Accordingly, any WD 22 associated with an MU may be part of more than one space 70 where the WD 22 is a MU, and any WD 22 associated with a user may be part of more than one space 70 where that WD 22 is not an MU. For example, WD 22*a*, as an MU, may have one or more spaces, e.g., ellipses, based on a multitude of traveling use cases or traveling parameters. Some nonlimiting examples of traveling use cases include a trailing hazard warning being a first ellipse, a rear-end collision being second ellipse, a pothole on the road being a third ellipse, ice on thoroughfare being a fourth ellipse, a turn being a fifth ellipse, wrong way driving being a sixth ellipse, a seventh ellipse being a combination of at least two of ellipses. In some cases, one ellipse becomes sufficient to handle more than one use case or all use cases. Any of the ellipses in this example are not limited to being ellipses and may be any kind of space.

Further, the network node 16 may exclude other WDs 22, such as WD 22*e* and WD 22*f*, from the space 70, e.g., for failure to meet one or more requirements to be in the space 70 or based on a predetermined requirement for exclusion. For example, the network node 16 has excluded WD 22*e* from the space 70, which may be for being farther than a predetermined distance from one of the WDs 22 in space 70. Similarly, the network node 16 has excluded WD 22*f* from space 70, which may be in part due to the traveling direction and lane location of WD 22*f*. Thus, at least one WD 22 may be excluded from being within space 70, even when physically located within the space. A nonlimiting example of an WD 22 that may be excluded may be a WD 22 associated with a first responder vehicle.

Relative Positioning

The network node 16 may track the WDs 22 that are within the determined space. Tracking may be performed relative to the WD 22 that is associated with the MU, such as via relative positioning vectors. Relative positioning vectors may by dynamic and rescale in real time based on predetermined factors.

Figure 9:
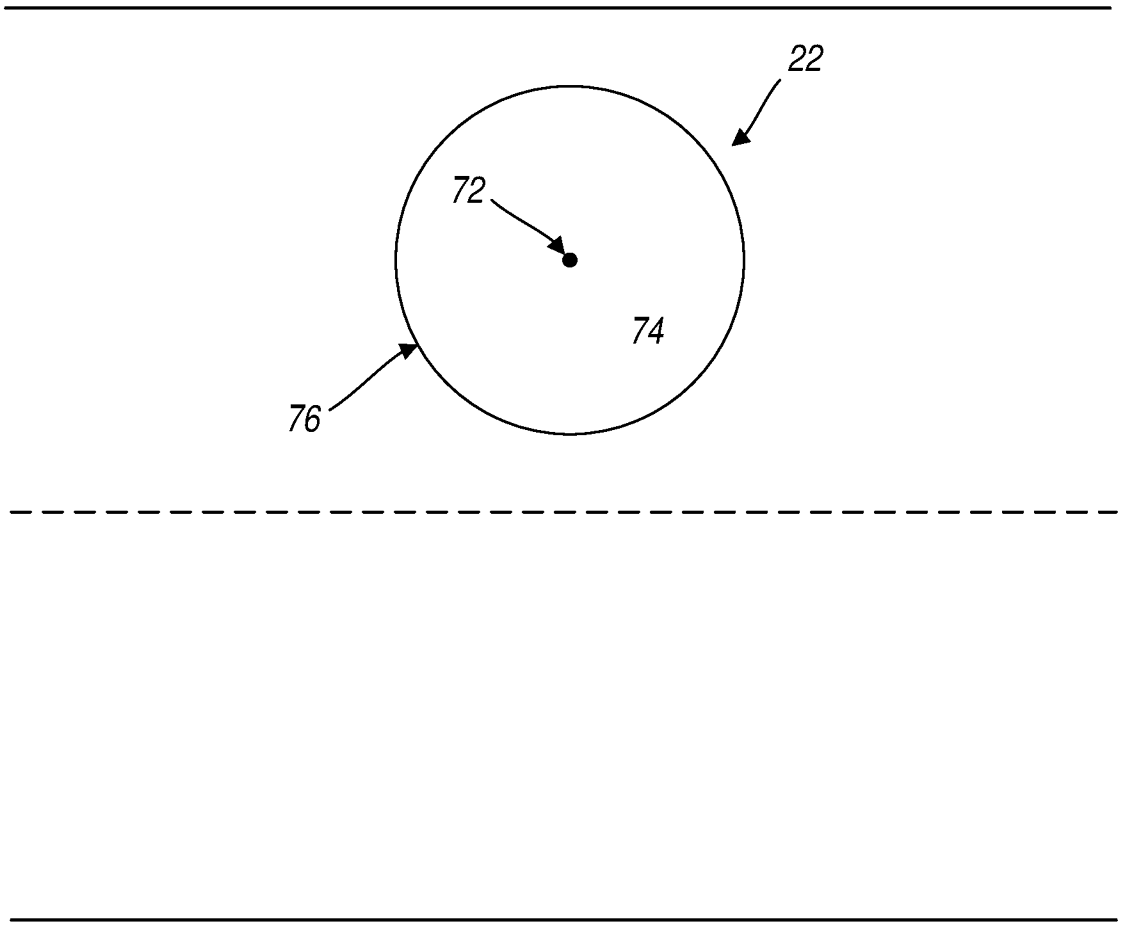
FIG. 9 shows a diagram of an example absolute location of a wireless device according to some embodiments of the present disclosure.

FIG. 9 shows a diagram of an example absolute location of a WD 22 according to some embodiments of the present disclosure. The absolute location 72 of a WD 22, whether associated with a user or an MU or not associated with any user, is within a confidence space 74. The confidence space 74 may be of any shape, area, or volume, and represents an uncertainty of the absolute location of the WD 22. The confidence space has an absolute location boundary 76, and the absolute location 72 of the WD 22 is within the absolute location boundary 76. The absolute location 72, the confidence space 74, and the absolute location boundary 76 may be determined by the network node 16 and/or the WD 22.

Figure 10:
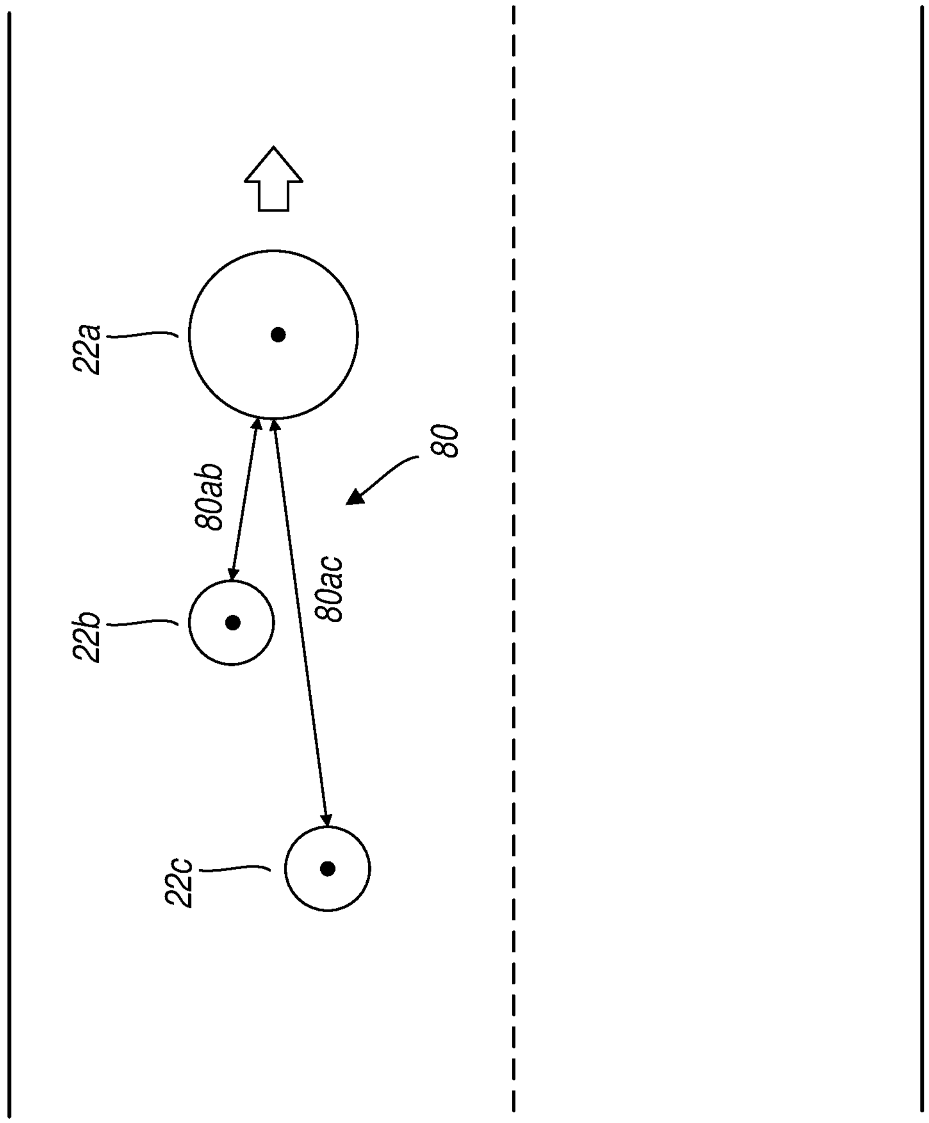
FIG. 10 shows a diagram of an example relative positioning structure including a group of wireless devices and vectors according to some embodiments of the present disclosure.

FIG. 10 shows a diagram of an example relative positioning structure including a group of wireless devices and vectors according to some embodiments of the present disclosure. More specifically, WDs 22*a*-22*c* are shown, each having an absolute location 72, a confidence space 74, and an absolute location boundary 76.

The network node 16 may determine a relative positioning structure which includes a group of WDs 22, e.g., WDs 22*a*-22*c*, and a set of vectors 80. Each vector 80 of the set of vectors extends between the absolute location boundary of one WD 22 to the absolute location boundary of another WD 22. A WD 22 may have more than one vector 80 extending from the absolute location boundary 76, and in some cases, may include more than one vector 80 extending to the same WD 22. The vectors 80 may also extend between any point in the confidence space 74 or absolute location 72 of each of two WDs 22. Thus, the relative poisoning structure may include any arrangement of WDs 22 and vectors 80 between WDs 22.

In this specific example, vector 80*ab* extends between WDs 22*a* and WD 22*b*, and vector 80*ac* extends between WDs 22*a* and WD22*c*. In other words, each vector extends between the absolute location boundary 76 of each WD 22.

The absolute location 72, confidence space 74, and absolute location boundary 76 of a WD 22 may be different from those of at least another WD 22 in part due to individual variance in positioning accuracy from device to device, or uncertainty changing for a given device based on environmental considerations, e.g., velocity, dense urban, poor RF environments. The network node 16 manages changes in absolute positioning accuracy as the vectors 80 that track relative positioning between vehicles may be "anchored" to the absolute location boundary 76 of the uncertainty space 74 closest to the relevant WDs 22 as determined by the spaces 70, e.g., ellipses, described above.

Figure 11:
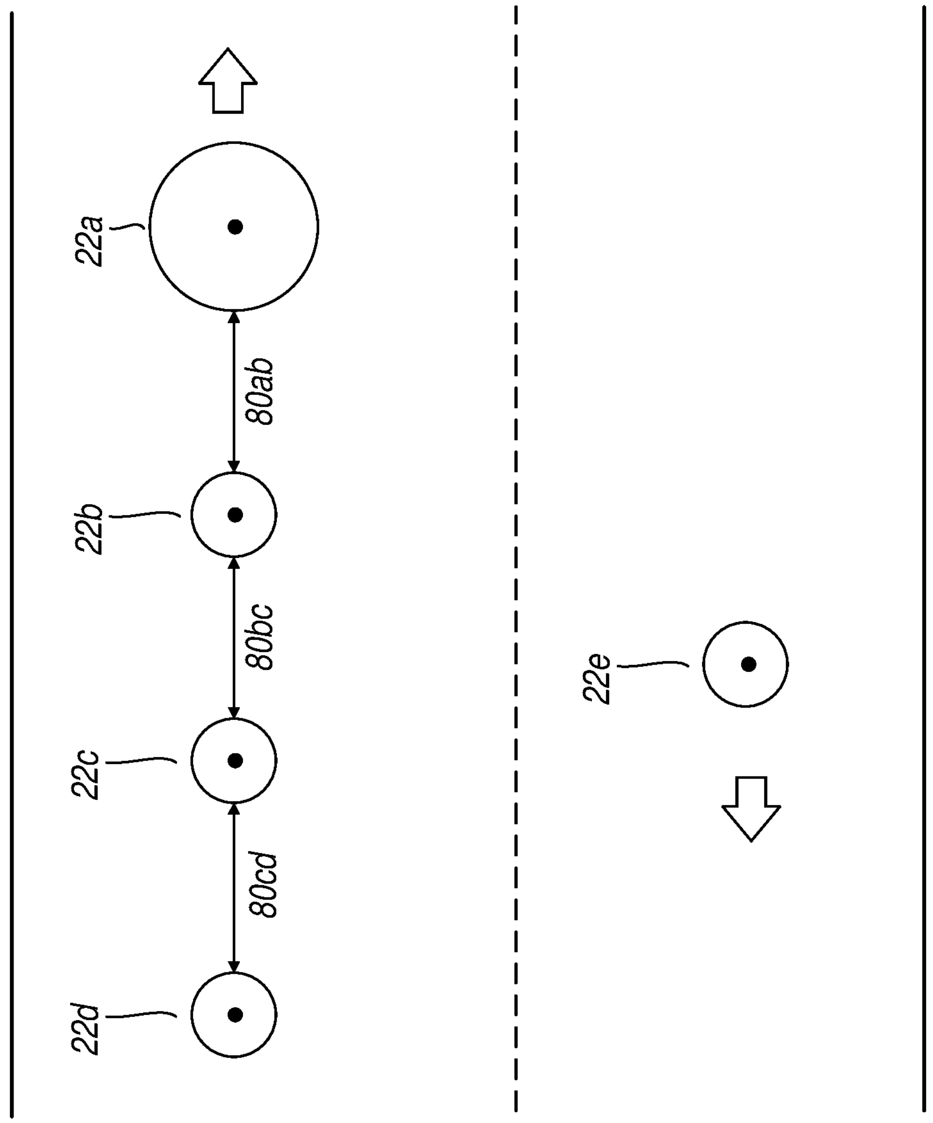
FIG. 11 shows a diagram of an example relative positioning structure including a group of wireless devices in a trailing arrangement and vectors according to some embodiments of the present disclosure.

FIG. 11 shows a diagram of an example relative positioning structure including a group of wireless devices in a trailing arrangement and vectors according to some embodiments of the present disclosure. The network node 16 may determine a relative positioning structure which includes a group of WDs 22, e.g., WDs 22*a*-22*d*, and a set of vectors 80. Vector 80*ab* extends between WDs 22*a* and WD 22*b*, vector 80*bc* extends between WDs 22*b* and WD22*c*, and vector 80*cd* extends between WD 22*c* and WD 22*d*. One vector 80 extends between the absolute location boundary 76 of each of two distinct WDs 22, there being no vector 80 between WD 22*a* and WD 22*b*.

WD 22*e* is traveling in an opposite direction to the direction traveled by each of WD 22*a*-22*d* and on a different lane. No vectors 80 are extended to or from WD 22*e* as WD 22*e* is not within the determined space 70.

Figure 12:
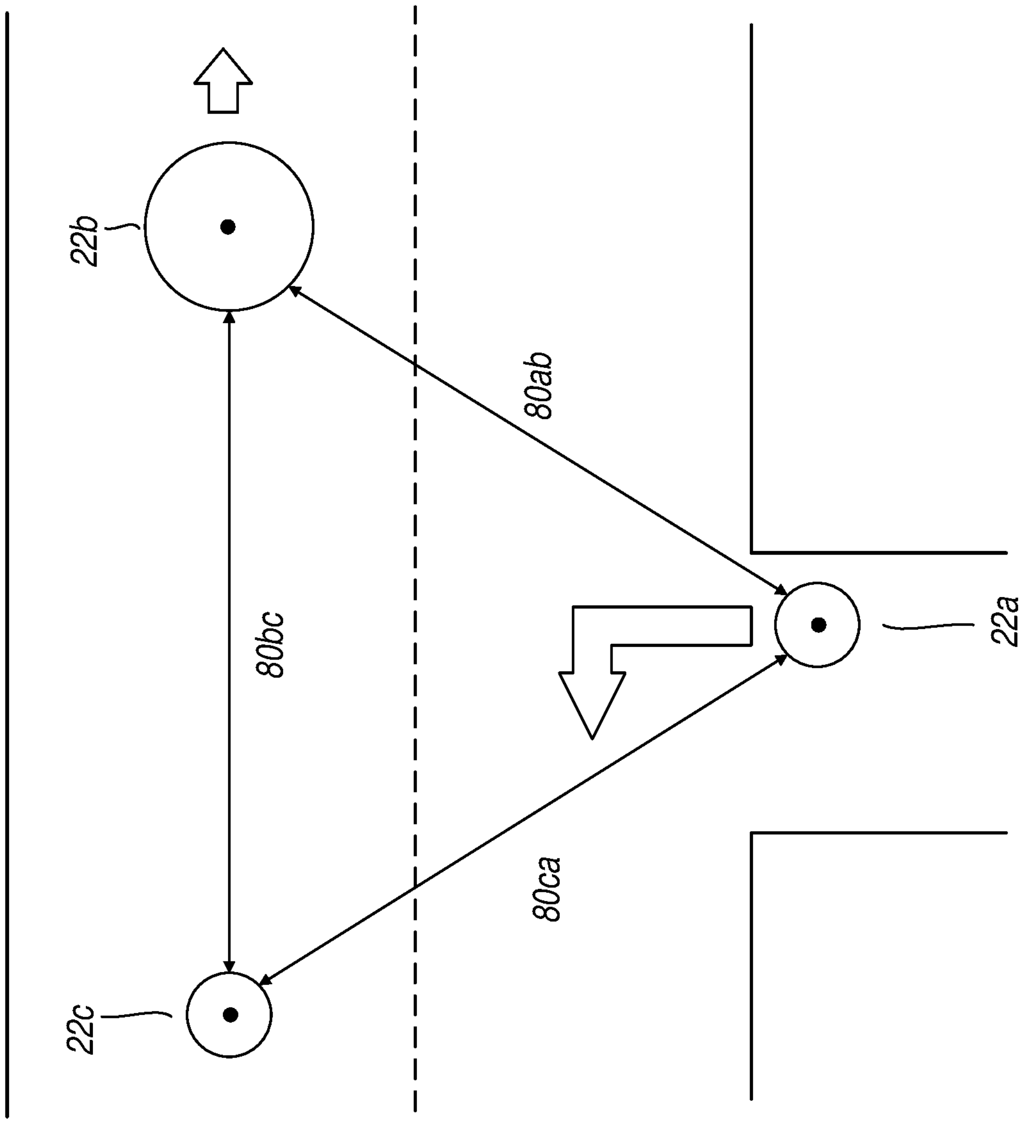
FIG. 12 shows a diagram of an example relative positioning structure including vectors, two wireless devices traveling in one lane, and another wireless device associated with a turn being made onto another lane according to some embodiments of the present disclosure.

FIG. 12 shows a diagram of an example relative positioning structure including vectors, two wireless devices traveling in one lane, and another wireless device associated with a turn being made onto another lane according to some embodiments of the present disclosure. The network node 16 may determine a relative positioning structure which includes a group of WDs 22, e.g., WDs 22*a*-22*c*, and a set of vectors 80. Vector 80*ab* extends between WD 22*a* and WD 22*b*, vector 80*bc* extends between WD 22*b* and WD 22*c*, and vector 80*ca* extends between WD 22*c* and WD 22*a*. At least one vector 80 extends between the absolute location boundary 76 of each one of two distinct WDs 22.

Figure 13:
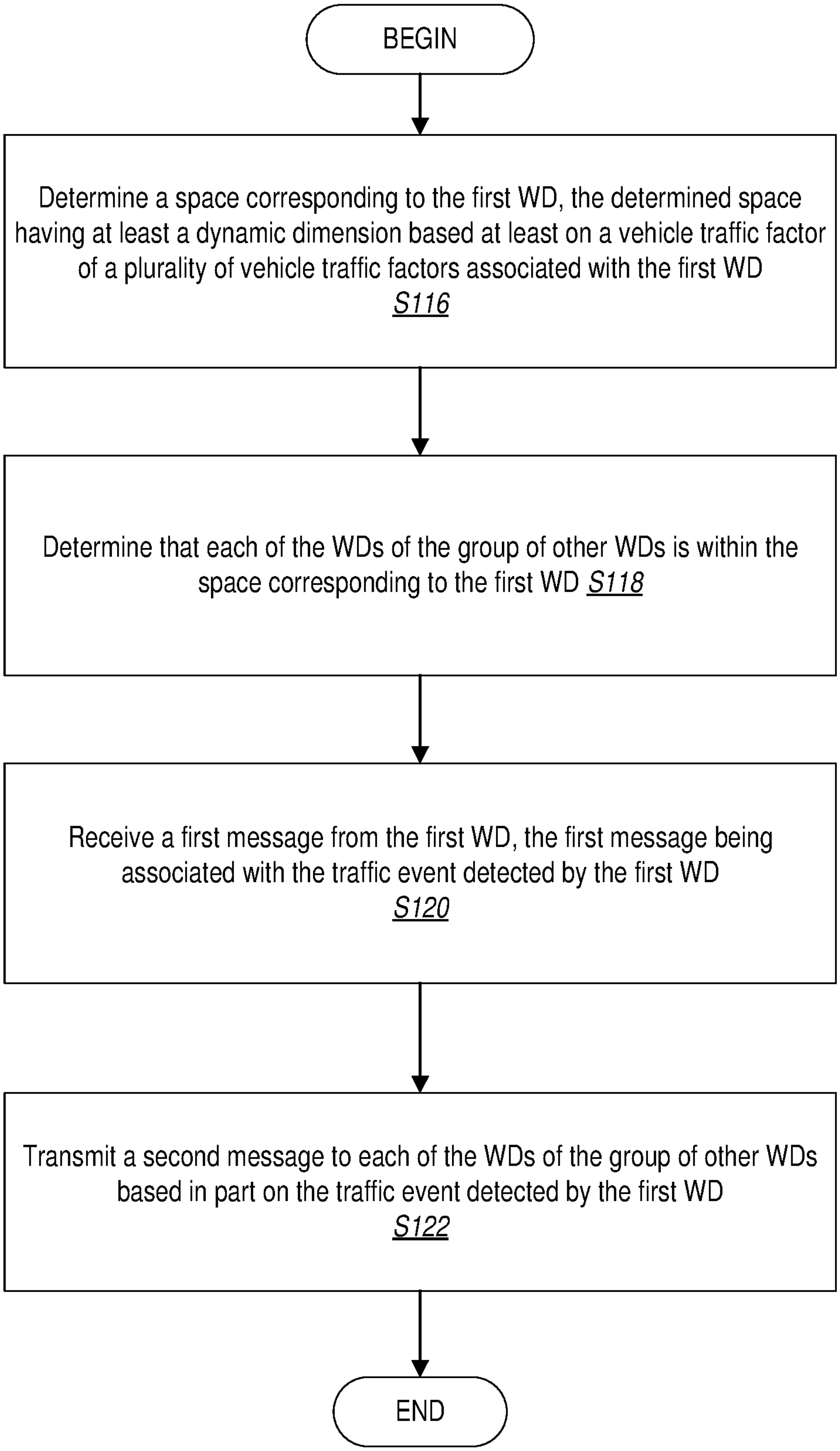
FIG. 13 is a flowchart of another example process in a network node for detecting and providing notification of hazardous road conditions according to some embodiments of the present disclosure.

FIG. 13 is a flowchart of another example process in a network node 16 for detecting and providing notification of hazardous road conditions according to some embodiments of the present disclosure. One or more Blocks and/or functions performed by network node 16 may be performed by one or more elements of network node 16 such as by node incident unit 32 in processing circuitry 50, processor 54, communication interface 46, radio interface 48, etc. In one or more embodiments, network node 16 such as via one or more of processing circuitry 50, processor 54, radio interface 48 and communication interface 46 is configured to determine (Block S116) a space 70 corresponding to the first WD 22*a*. The determined space 70 has at least a dynamic dimension based at least on a vehicle traffic factor of a plurality of vehicle traffic factors associated with the first WD 22*a*. The network node 16 such as via one or more of processing circuitry 50, processor 54, radio interface 48 and communication interface 46 is further configured to determine (Block S118) that each of the WDs 22 of the group of other WDs is within the space 70 corresponding to the first WD 22*a*, receive (Block S120) a first message from the first WD 22*a*, the first message being associated with the traffic event detected by the first WD 22*a*, and transmit (Block S122) a second message to each of the WDs 22 of the group of other WDs based in part on the traffic event detected by the first WD 22*a*.

In some embodiments, the first WD 22*a* is associated with a first vehicle and the group of other WDs is associated with a group of other vehicles. Each of the WDs 22 of the group of other WDs corresponds to a specific vehicle of the group of other vehicles. In addition, the determined space 70 that corresponds to the first WD 22*a* is one of a first space corresponding at least to a first traveling parameter of a plurality of traveling parameters; a second space corresponding at least to a second traveling parameter of the plurality of traveling parameters; a third space corresponding at least to the first traveling parameter and the second traveling parameter of the plurality of traveling parameters; and a fourth space corresponding to the plurality of traveling parameters. The plurality of traveling parameters includes at least the first traveling parameter that is associated with a traveling direction of the group of other vehicles that is similar to a traveling direction of the first vehicle. The plurality of traveling parameters also includes the second traveling parameter that is associated with the first vehicle making a turn. The plurality of traveling parameters further includes the third traveling parameter that is associated with the traveling direction of the first vehicle being opposite to the traveling direction of the group of other vehicles.

In some other embodiments, the plurality of vehicle traffic factors includes at least one of a thoroughfare characteristic, a traveling speed, a traveling direction, and a weather parameter. In an embodiment, the first WD 22*a* is located outside the space 70.

In another embodiment, the processing circuitry 50 is further configured to establish a connection between the first WD 22*a* and each of the WDs 22 of the group of other WDs. The connection is at least one of a multi-point connection via the network node 16 and a continuous connection that is maintained while the group of other WDs includes at least one WD 22. The processing circuitry 50 is further configured to determine whether a latency of the established connection exceeds a predetermined latency threshold, where the predetermined latency threshold is based at least on a radio access technology. The processing circuitry 50 is further configured to, when the latency exceeds the predetermined latency threshold, adjust the latency at least by transmitting a heartbeat signal every time a predetermined interval of time has elapsed.

In some embodiments, the processing circuitry 50 is further configured to determine an absolute location of each of the WDs 22 of the set of WDs. The absolute location 72 of each of the WDs 22 of the set of WDs includes a confidence space 74 representing an absolute location uncertainty, and the confidence space 74 has an absolute location boundary 76. The processing circuitry 50 is further configured to determine a relative positioning structure including each WD 22 of the set of WDs and a set of vectors. Each vector 80 of the set of vectors extends and has a length from the absolute location boundary 76 of one WD 22 of the set of WDs to the absolute location boundary 76 of another WD 22 of the set of WDs. The group of other WDs includes a second WD 22*b* and a third WD 22*c*. The relative positioning structure includes at least one of (1) a first vector extending between the first WD 22*a* and the second WD 22*b*, and a second vector extending between the first WD 22*a* and the third WD 22*c*; (2) the first vector extending between the first WD 22*a* and the second WD 22*b*, the second vector extending between the second WD 22*b* and the third WD 22*c*; and (3) the first vector extending between the first WD 22*a* and the second WD 22*b*, the second vector extending between the second WD 22*b* and the third WD 22*c*, and a third vector extending from the first WD 22*a* to the third WD 22*c*. The processing circuitry 50 is further configured to determine a relative position at least between the first WD 22*a* and each of the WDs 22 of the group of other WDs based on the relative positioning structure.

In some other embodiments, transmitting the second message to each of the WDs 22 of the subset of WDs is further based on the determined relative position at least between the first WD 22*a* and each of the WDs 22 of the subset of WDs. In an embodiment, the processing circuitry 50 is further configured to determine a position accuracy of each WD 22 of the set of WDs based at least on an environmental condition. The processing circuitry 50 is also configured to determine the confidence space 74 and the absolute location boundary 76 of each WD 22 of the set of WDs, based on the determined positioning accuracy, and dynamically adjust the length each vector 80 of the set of vectors based in part on the determined confidence space 74 and the determined absolute location boundary 76 of each WD 22.

In another embodiment, the processing circuitry 50 is further configured to store information associated at least with the first WD 22*a* and the group of other WDs in a first communication network and transfer the information from the first communication network to a second communication network geographically associated with the first WD 22*a*. The processing circuitry 50 is also configured to set up a fifth space based on determined space 70 corresponding to the first WD 22*a* and the transferred information.

In some embodiments, the first WD 22*a* is associated at least with a sensor 60 that reports a thoroughfare condition. In some other embodiments, the processing circuitry 50 is further configured to determine and coordinate an accident-avoidance response between the first vehicle and the group of other vehicles based in part on the received first message from the first WD 22*a*. The first message includes an indication that the first vehicle poses a threat to at least one of the vehicles of the group of other vehicles, and the transmitted second message to each of the WDs 22 is further based on the coordinated accident-avoidance response.

In an embodiment, the transmitted second message to each of the WDs 22 of the group of other WDs causes at least one WD 22 of the group of other WDs to perform an action including one of generating one of an audio alert and a visual alert and causing an avoidance maneuver including one of a reduction of a speed, a change of lanes, a route change, and a transmittal of a warning message.

Figure 14:
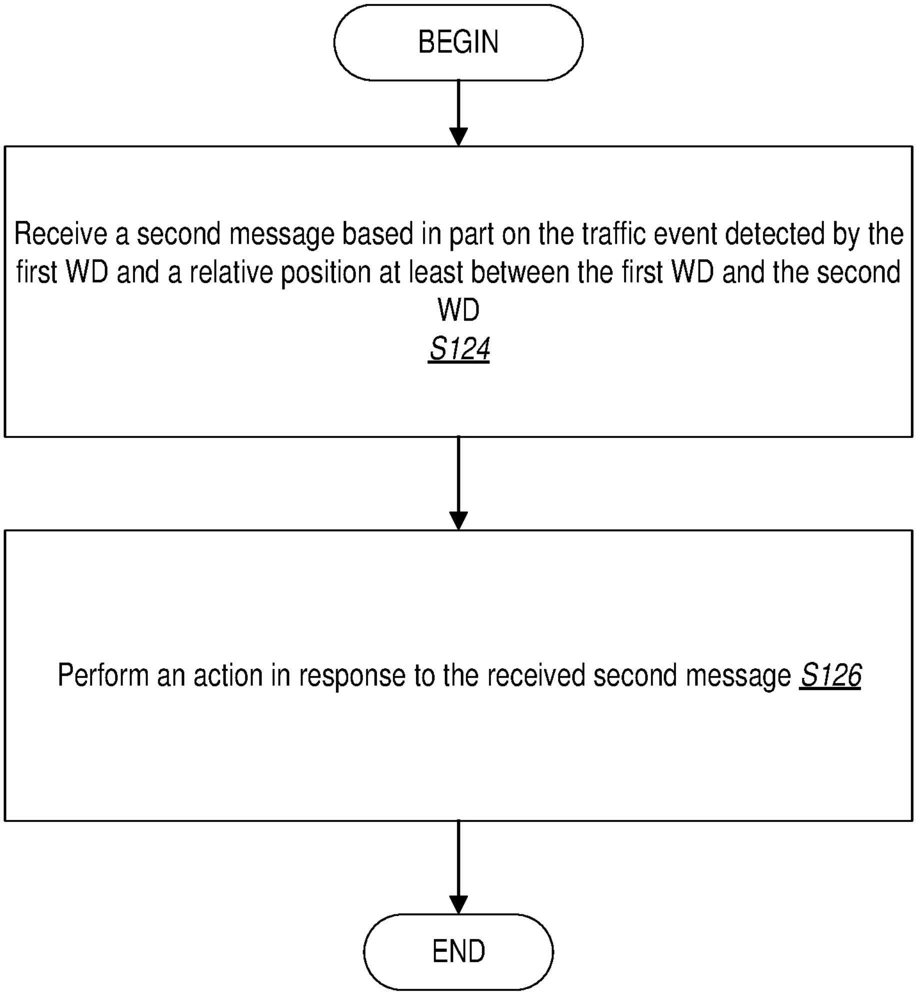
FIG. 14 is a flowchart of another example process in a second wireless device for detecting and providing notification of hazardous road conditions according to some embodiments of the present disclosure.

FIG. 14 is a flowchart of another example process in a second WD 22*b* for detecting and providing notification of hazardous road conditions according to some embodiments of the present disclosure. One or more Blocks and/or functions performed by the second WD 22*b* may be performed by one or more elements of the second WD 22*b* such as by WD incident unit 34*b* in processing circuitry 36, processor 40, radio interface 30, etc. In one or more embodiments, the second WD 22*b* such as via one or more of processing circuitry 36, processor 40, and radio interface 30, is configured to receive (Block S124) a second message based in part on the traffic event detected by the first WD 22*a* and a relative position at least between the first WD 22*a* and the second WD 22*b*. The second WD 22*b* such as via one or more of processing circuitry 36, processor 40, and radio interface 30, is further configured to perform (Block S126) an action in response to the received second message.

In some embodiments, the action includes one of generating one of an audio alert and a visual alert and performing an avoidance maneuver including one of a reduction of a speed, a change of lanes, a route change, and a transmittal of a warning message.

In some other embodiments, the first WD 22*a* and the second WD 22*b* are located within a space corresponding to the first WD 22*a*, the space has at least a dynamic dimension based at least on a vehicle traffic factor of a plurality of vehicle traffic factors associated with the first WD 22*a*, and the plurality of vehicle traffic factors includes at least one of a thoroughfare characteristic, a traveling speed, a traveling direction, and a weather parameter.

In an embodiment, the first WD 22*a* is associated with a first vehicle, the second WD 22*b* is associated with a second vehicle, and the group of other WDs is associated with a group of other vehicles. Each of the WDs 22 of the group of other WDs corresponds to a distinct vehicle of the group of other vehicles. The space 70 corresponding to the first WD 22*a* is one of a first space corresponding at least to a first traveling parameter of a plurality of traveling parameters; a second space corresponding at least to a second traveling parameter of the plurality of traveling parameters; a third space corresponding at least to the first traveling parameter and the second traveling parameter of the plurality of traveling parameters; and a fourth space corresponding to the plurality of traveling parameter. The plurality of traveling parameters includes at least the first traveling parameter associated with a traveling direction of the group of other vehicles and the second vehicle that is similar to a traveling direction of the first vehicle. The plurality of traveling parameters also includes the second traveling parameter associated with the first vehicle making a turn. The plurality of traveling parameters further includes the third traveling parameter associated with the traveling direction of the first vehicle that is opposite to the traveling direction of the group of other vehicles and the second vehicle.

In another embodiment, the processing circuitry 36 is further configured to establish a connection between the second WD 22*b* and at least the first WD 22*a*. The connection is at least one of a multi-point connection via the network node 16 and a continuous connection that is maintained with the second WD 22*b* while the second WD 22*b* is in the space. The processing circuitry is further configured to, when a latency of the established connection exceeds a predetermined latency threshold, receive a heartbeat signal. The heartbeat signal is transmitted every time a predetermined interval of time has elapsed.

In some embodiments, the relative position is further between the first WD 22*a* and each of the WDs 22 of the group of other WDs based on a relative positioning structure. The relative positioning structure includes the first WD 22*a*, the second WD 22*b*, each WD 22 of the group of other WDs, and a set of vectors. Each vector 80 of the set of vectors extends and has a length between an absolute location boundary 76 of one WD 22 of any one of the first WD 22*a*, the second WD 22*b*, and the group of other WDs and an absolute location boundary 76 of another WD 22 of any one of the first WD 22*a*, the second WD 22*b*, and the group of other WDs. The group of other WDs includes a third WD 22*c*. The relative positioning structure includes at least one of (1) a first vector extending between the first WD 22*a* and the second WD 22*b*, and a second vector extending between the first WD 22*a* and the third WD 22*c*; (2) the first vector extending between the first WD 22*a* and the second WD 22*b*, the second vector extending between the second WD 22*b* and the third WD 22*c*; and (3) the first vector extending between the first WD 22*a* and the second WD 22*a*, the second vector extending between the second WD 22*b* and the third WD 22*c*, and a third vector extending from the first WD 22*a* to the third WD 22*c*. The absolute location boundary is part of an absolute location 72 of one of the first WD 22*a*, the second WD 22*b*, and each of the WDs 22 of the group of other WDs. The absolute location of the first WD 22*a*, the second WD 22*b*, and each of the WDs 22 of the group of other WDs includes a confidence space 74 that represents an absolute location uncertainty. In addition, the confidence space 74 has the absolute location boundary 76.

In some other embodiments, the confidence space 74 and the absolute location boundary 76 of each of the first WD 22*a*, the second WD 22*b*, and each WD 22 of the group of other WDs is based on a determined positioning accuracy. The length of each vector 80 of the set of vectors is dynamically adjustable based in part on the confidence space 74 and the absolute location boundary 76 of each WD 22.

In an embodiment, the space 70 is a fifth space that is set up based at least on information stored in a first communication network and associated at least with the first WD 22*a*, the second WD 22*b*, and the group of other WDs. The information is transferred from the first communication network to a second communication network geographically associated with the first WD 22*a*. In another embodiments, the first WD 22*a* is associated at least with a sensor 60 that reports a thoroughfare condition.

In some embodiments, the received second message is further based on a coordinated accident-avoidance response. The coordinated accident-avoidance response being between the first vehicle, the second vehicle, and the group of other vehicles based in part on a first message from the first WD 22*a*, the first message being associated with the traffic event detected the first WD 22*a*, the first message including an indication that the first vehicle poses a threat to at least one of the second vehicle and the vehicles of the group of other vehicles.

Edge Cloud

In some embodiments, the determined space associated, e.g., the space associated with an MU, may be managed by the network node 16 to keep close proximity between the WDs 22 and the network node 16 and to ensure latency thresholds/targets are met. As the WD 22 associated with the MU, e.g., WD 22*a*, traverses geographies, a communication network, e.g., a global cloud system, may coordinate the transfer of the MUs information and/or information of WDs 22 associated with MUs so that new spaces with low latency can be set up and maintained in a new location. According to some embodiments, this may be coordinated by a hierarchical communication network, e.g., a cloud system that consists of a global cloud and an edge cloud system. In some other embodiments, the global cloud system has a database of all users/WDs 22 in the system, but geographically relevant users/WDs 22 are managed by the edge cloud system. As the geographies of users/WDs 22 change from time to time, the users/WDs 22 may be transferred to edge cloud services where the users/WDs 22 are geographically relevant. In certain geographies, the edge cloud system and global cloud system are co-located. Some other embodiments may include the following:

Embodiment A1. A network node configured to communicate with a first wireless device (WD) and a second wireless device, the network node configured to, and/or comprising a radio interface and/or comprising processing circuitry configured to:

receive an indication from the first WD of a hazardous road traffic condition;

determine that a second WD should receive an alert based on the indication; and send a notification to the second WD that causes the second WD produce an alert notifying a user of the second WD of the hazardous road traffic condition.

Embodiment A2. The network node of Embodiment A1, wherein the first WD is associated with a first vehicle and the second WD is associated with a second vehicle.

Embodiment A3. The network node of Embodiments A1 and A2, wherein the network node and/or the radio interface and/or the processing circuitry is further configured to determine that the hazardous road traffic condition is a threat to a vehicle associated with the second WD and coordinate an accident avoidance response between a plurality of vehicles if the hazardous road traffic condition is determined to be a threat.

Embodiment A4. The network node of any one of Embodiments A1-A3, wherein the network node and/or the radio interface and/or the processing circuitry is further configured to:

receive sensor information regarding a potentially hazardous road traffic condition; determine if the sensor information is indicative of a potential threat to a WD being monitored by the network node; and if the sensor information is indicative of a potential threat to a WD being monitored by the network node, notify the threatened WD of the potential threat.

Embodiment A5. The network node of any one of Embodiments A1-A4, wherein the alert is a voice command to initiate braking.

Embodiment A6. The network node of any one of Embodiments A1-A5, wherein the alert triggers an automatic braking function of a vehicle associated with the second WD.

Embodiment B1. A method implemented in a network node, the method comprising: receiving an indication from a first wireless device (WD) of a hazardous road traffic condition;

determining that a second WD should receive an alert based on the indication; and sending a notification to the second WD that causes the second WD produce an alert notifying a user of the second WD of the hazardous road traffic condition.

Embodiment B2. The method of Embodiment B1, wherein the first WD is associated with a first vehicle and the second WD is associated with a second vehicle.

Embodiment B3. The method of Embodiments B1 and B2, further comprising determining that the hazardous road traffic condition is a threat to a vehicle associated with the second WD and coordinating an accident avoidance response between a plurality of vehicles if the hazardous road traffic condition is determined to be a threat.

Embodiment B4. The method of any one of Embodiments B1-B3, further comprising:

receiving sensor information regarding a potentially hazardous road traffic condition; determining if the sensor information is indicative of a potential threat to a WD being monitored by the network node; and if the sensor information is indicative of a potential threat to a WD being monitored by the network node, notifying the threatened WD of the potential threat.

Embodiment B5. The method of any one of Embodiments B1-B4, wherein the alert is a voice command to initiate braking.

Embodiment B6. The method of any one of Embodiments B1-B5, wherein the alert triggers an automatic braking function of a vehicle associated with the second WD.

Embodiment C1. A wireless device (WD) configured to communicate with a network node, the WD configured to, and/or comprising a radio interface and/or processing circuitry configured to:

receive a notification from the network node that a hazardous road traffic condition has been detected by another WD and that the network node has determined that the hazardous road traffic condition is a potential threat to a vehicle associated with the WD; and in response to receiving the notification, trigger a responsive action.

Embodiment C2. The WD of Embodiment C1, the WD, radio interface and/or processing circuitry further configured to detect a hazardous road traffic condition and send a notification to the network node of the hazardous road traffic condition.

Embodiment C3. The WD of Embodiments C1 and C2, wherein the other WD is associated with a second vehicle.

Embodiment C4. The WD of any one of Embodiments C1-C3, the WD, radio interface and/or processing circuitry further configured to receive sensor information from a sensor regarding a potentially hazardous road traffic condition and send a notification to the network node of the hazardous road traffic condition.

Embodiment D1. A method implemented in a wireless device (WD), the method comprising:

receiving a notification from a network node that a hazardous road traffic condition has been detected by another WD and that the network node has determined that the hazardous road traffic condition is a potential threat to a vehicle associated with the WD; and in response to receiving the notification, triggering a responsive action.

Embodiment D2. The method of Embodiment D1, further comprising detecting a hazardous road traffic condition and sending a notification to the network node of the hazardous road traffic condition.

Embodiment D3. The method of Embodiments D1 and D2, wherein the other WD is associated with a second vehicle.

Embodiment D4. The method of any one of Embodiments D1-D3, further comprising receiving sensor information from a sensor regarding a potentially hazardous road traffic condition and sending a notification to the network node of the hazardous road traffic condition.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a set of wireless devices (WDs) including at least a first WD configured to detect a traffic event and a group of other WDs, the network node comprising processing circuitry configured to:

determine a space corresponding to the first WD, the determined space having at least a dynamic dimension based at least on a vehicle traffic factor of a plurality of vehicle traffic factors associated with the first WD;

determine that each of the WDs of the group of other WDs is within the space corresponding to the first WD;

receive a first message from the first WD, the first message being associated with the traffic event detected by the first WD;

transmit a second message to each of the WDs of the group of other WDs based in part on the traffic event detected by the first WD;

establish a connection between the first WD and each of the WDs of the group of other WDs;

determine whether a latency of the established connection exceeds a predetermined latency threshold; and when the latency exceeds the predetermined latency threshold, adjust the latency at least by transmitting a heartbeat signal every time a predetermined interval of time has elapsed.

2. The network node of claim 1, wherein the first WD is associated with a first vehicle and the group of other WDs is associated with a group of other vehicles, each of the WDs of the group of other WDs corresponding to a specific vehicle of the group of other vehicles, the determined space corresponding to the first WD is one of:

a first space corresponding at least to a first traveling parameter of a plurality of traveling parameters;

a second space corresponding at least to a second traveling parameter of the plurality of traveling parameters;

a third space corresponding at least to the first traveling parameter and the second traveling parameter of the plurality of traveling parameters; and a fourth space corresponding to the plurality of traveling parameters, the plurality of traveling parameters including at least the first traveling parameter associated with a traveling direction of the group of other vehicles being similar to a traveling direction of the first vehicle, the second traveling parameter associated with the first vehicle making a turn, and a third traveling parameter associated with the traveling direction of the first vehicle being opposite to the traveling direction of the group of other vehicles.

3. A method for a network node configured to communicate with a set of wireless devices (WDs) including at least a first WD configured to detect a traffic event and a group of other WDs, the method including:

determining a space corresponding to the first WD, the determined space having at least a dynamic dimension based at least on a vehicle traffic factor of a plurality of vehicle traffic factors associated with the first WD;

determining that each of the WDs of the group of other WDs is within the space corresponding to the first WD;

receiving a first message from the first WD, the first message being associated with the traffic event detected by the first WD;

transmitting a second message to each of the WDs of the group of other WDs based in part on the traffic event detected by the first WD;

establishing a connection between the first WD and each of the WDs of the group of other WDs;

determining whether a latency of the established connection exceeds a predetermined latency threshold; and when the latency exceeds the predetermined latency threshold, adjusting the latency at least by transmitting a heartbeat signal every time a predetermined interval of time has elapsed.

4. The method of claim 3, wherein the first WD is associated with a first vehicle and the group of other WDs is associated with a group of other vehicles, each of the WDs of the group of other WDs corresponding to a specific vehicle of the group of other vehicles, the determined space corresponding to the first WD is one of:

a first space corresponding at least to a first traveling parameter of a plurality of traveling parameters;

a second space corresponding at least to a second traveling parameter of the plurality of traveling parameters;

a third space corresponding at least to the first traveling parameter and the second traveling parameter of the plurality of traveling parameters; and a fourth space corresponding to the plurality of traveling parameters, the plurality of traveling parameters including at least the first traveling parameter associated with a traveling direction of the group of other vehicles being similar to a traveling direction of the first vehicle, the second traveling parameter associated with the first vehicle making a turn, and a third traveling parameter associated with the traveling direction of the first vehicle being opposite to the traveling direction of the group of other vehicles.

5. The method of claim 4, the method further including:

determining and coordinating an accident-avoidance response between the first vehicle and the group of other vehicles based in part on the received first message from the first WD, the first message including an indication that the first vehicle poses a threat to at least one of the vehicles of the group of other vehicles, the transmitted second message to each of the WDs being further based on the coordinated accident-avoidance response.

6. The method of claim 3, wherein the plurality of vehicle traffic factors includes at least one of a thoroughfare characteristic, a traveling speed, a traveling direction, and a weather parameter.

7. The method of claim 3, wherein the first WD is located outside the space.

8. The method of claim 3, wherein:

the connection is at least one of a multi-point connection via the network node and a continuous connection that is maintained while the group of other WDs includes at least one WD; and the predetermined latency threshold is based at least on a radio access technology.

9. The method of claim 3, the method further including:

determining an absolute location of each of the WDs of the set of WDs, the absolute location of each of the WDs of the set of WDs including a confidence space representing an absolute location uncertainty, the confidence space having an absolute location boundary;

determining a relative positioning structure including each WD of the set of WDs and a set of vectors, each vector of the set of vectors extending and having a length from the absolute location boundary of one WD of the set of WDs to the absolute location boundary of another WD of the set of WDs, the group of other WDs including a second WD and a third WD, the relative positioning structure including at least one of:

a first vector extending between the first WD and the second WD, and a second vector extending between the first WD and the third WD;

the first vector extending between the first WD and the second WD, the second vector extending between the second WD and the third WD; and the first vector extending between the first WD and the second WD, the second vector extending between the second WD and the third WD, and a third vector extending from the first WD to the third WD; and determining a relative position at least between the first WD and each of the WDs of the group of other WDs based on the relative positioning structure.

10. The method of claim 9, wherein transmitting the second message to each of the WDs of the group of other WDs is further based on the determined relative position at least between the first WD and each of the WDs of the group of other WDs.

11. The method of claim 9, the method further including:

determining a position accuracy of each WD of the set of WDs based at least on an environmental condition;

determining the confidence space and the absolute location boundary of each WD of the set of WDs based on the determined positioning accuracy; and dynamically adjusting the length each vector of the set of vectors based in part on the determined confidence space and the determined absolute location boundary of each WD.

12. The method of claim 3, the method further including:

storing information associated at least with the first WD and the group of other WDs in a first communication network;

transferring the information from the first communication network to a second communication network geographically associated with the first WD; and setting up a fifth space based on the determined space corresponding to the first WD and the transferred information.

13. The method of claim 3, wherein the first WD is associated at least with a sensor that reports a thoroughfare condition.

14. The method of claim 3, wherein the transmitted second message to each of the WDs of the group of other WDs causes at least one WD of the group of other WDs to perform an action including one of:

generating one of an audio alert and a visual alert; and causing an avoidance maneuver including one of a reduction of a speed, a change of lanes, a route change, and a transmittal of a warning message.

15. A second wireless device (WD) configured to communicate with a network node, a first WD configured to detect a traffic event, and a group of other WDs, the second WD comprising processing circuitry configured to:

receive a second message based in part on the traffic event detected by the first WD and a relative position at least between the first WD and the second WD;

perform an action in response to the received second message;

establishing a connection between the second WD and at least the first WD; and when a latency of the established connection exceeds a predetermined latency threshold, receiving a heartbeat signal, the heartbeat signal being transmitted every time a predetermined interval of time has elapsed, wherein the first WD and the second WD are located within a space corresponding to the first WD.

16. The second WD of claim 15, wherein the space has at least a dynamic dimension based at least on a vehicle traffic factor of a plurality of vehicle traffic factors associated with the first WD, the plurality of vehicle traffic factors including at least one of a thoroughfare characteristic, a traveling speed, a traveling direction, and a weather parameter, wherein the first WD is associated with a first vehicle, the second WD is associated with a second vehicle, and the group of other WDs is associated with a group of other vehicles, each of the WDs of the group of other WDs corresponding to a distinct vehicle of the group of other vehicles, the space corresponding to the first WD is one of:

a first space corresponding at least to a first traveling parameter of a plurality of traveling parameters;

a second space corresponding at least to a second traveling parameter of the plurality of traveling parameters;

a third space corresponding at least to the first traveling parameter and the second traveling parameter of the plurality of traveling parameters; and a fourth space corresponding to the plurality of traveling parameters, the plurality of traveling parameters including at least the first traveling parameter associated with a traveling direction of the group of other vehicles and the second vehicle being similar to a traveling direction of the first vehicle, the second traveling parameter associated with the first vehicle making a turn, and a third traveling parameter associated with the traveling direction of the first vehicle being opposite to the traveling direction of the group of other vehicles and the second vehicle.

17. A method for a second wireless device (WD) configured to communicate with a network node, a first WD configured to detect a traffic event, and a group of other WDs, the method including:

receiving a second message based in part on the traffic event detected by the first WD and a relative position at least between the first WD and the second WD;

performing an action in response to the received second message;

establishing a connection between the second WD and at least the first WD; and when a latency of the established connection exceeds a predetermined latency threshold, receiving a heartbeat signal, the heartbeat signal being transmitted every time a predetermined interval of time has elapsed, wherein the first WD and the second WD are located within a space corresponding to the first WD.

18. The method of claim 17, wherein the action includes one of:

generating one of an audio alert and a visual alert; and performing an avoidance maneuver including one of a reduction of a speed, a change of lanes, a route change, and a transmittal of a warning message.

19. The method of claim 17, wherein the space has at least a dynamic dimension based at least on a vehicle traffic factor of a plurality of vehicle traffic factors associated with the first WD, the plurality of vehicle traffic factors including at least one of a thoroughfare characteristic, a traveling speed, a traveling direction, and a weather parameter.

20. The method of claim 19, wherein the first WD is associated with a first vehicle, the second WD is associated with a second vehicle, and the group of other WDs is associated with a group of other vehicles, each of the WDs of the group of other WDs corresponding to a distinct vehicle of the group of other vehicles, the space corresponding to the first WD is one of:

a first space corresponding at least to a first traveling parameter of a plurality of traveling parameters;

a second space corresponding at least to a second traveling parameter of the plurality of traveling parameters;

a third space corresponding at least to the first traveling parameter and the second traveling parameter of the plurality of traveling parameters; and a fourth space corresponding to the plurality of traveling parameters, the plurality of traveling parameters including at least the first traveling parameter associated with a traveling direction of the group of other vehicles and the second vehicle being similar to a traveling direction of the first vehicle, the second traveling parameter associated with the first vehicle making a turn, and a third traveling parameter associated with the traveling direction of the first vehicle being opposite to the traveling direction of the group of other vehicles and the second vehicle.

21. The method of claim 20, wherein the space is a fifth space that is set up based at least on information stored in a first communication network and associated at least with the first WD, the second WD, and the group of other WDs, the information being transferred from the first communication network to a second communication network geographically associated with the first WD.

22. The method of claim 20, wherein the received second message is further based on a coordinated accident-avoidance response, the coordinated accident-avoidance response being between the first vehicle, the second vehicle, and the group of other vehicles based in part on a first message from the first WD, the first message being associated with the traffic event detected the first WD, the first message including an indication that the first vehicle poses a threat to at least one of the second vehicle and the vehicles of the group of other vehicles.

23. The method of claim 19, wherein the connection is at least one of a multi-point connection via the network node and a continuous connection that is maintained with the second WD while the second WD is in the space.

24. The method of claim 17, wherein the relative position is further between the first WD and each of the WDs of the group of other WDs based on a relative positioning structure, the relative positioning structure including the first WD, the second WD, each WD of the group of other WDs, and a set of vectors, each vector of the set of vectors extending and having a length between an absolute location boundary of one WD of any one of the first WD, the second WD, and the group of other WDs and an absolute location boundary of another WD of any one of the first WD, the second WD, and the group of other WDs, the group of other WDs including a third WD, the relative positioning structure including at least one of:

a first vector extending between the first WD and the second WD, and a second vector extending between the first WD and the third WD;

the first vector extending between the first WD and the second WD, the second vector extending between the second WD and the third WD; and the first vector extending between the first WD and the second WD, the second vector extending between the second WD and the third WD, and a third vector extending from the first WD to the third WD; and the absolute location boundary being part of an absolute location of one of the first WD, the second WD, and each of the WDs of the group of other WDs, the absolute location of the first WD, the second WD, and each of the WDs of the group of other WDs including a confidence space representing an absolute location uncertainty, the confidence space having the absolute location boundary.

25. The method of claim 24, wherein the confidence space and the absolute location boundary of each of the first WD, the second WD, and each WD of the group of other WDs is based on a determined positioning accuracy, and the length of each vector of the set of vectors is dynamically adjustable based in part on the confidence space and the absolute location boundary of each WD.

26. The method of claim 17, wherein the first WD is associated at least with a sensor that reports a thoroughfare condition.

* * * * *